United States Patent
Chang et al.

(10) Patent No.: US 8,238,424 B2
(45) Date of Patent: Aug. 7, 2012

(54) COMPLEXITY-BASED ADAPTIVE PREPROCESSING FOR MULTIPLE-PASS VIDEO COMPRESSION

(75) Inventors: Cheng Chang, Redmond, WA (US);
Chih-Lung Lin, Redmond, WA (US);
Thomas W. Holcomb, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1464 days.

(21) Appl. No.: 11/673,516

(22) Filed: Feb. 9, 2007

(65) Prior Publication Data
US 2008/0192822 A1    Aug. 14, 2008

(51) Int. Cl.
*H04N 7/12* (2006.01)
(52) U.S. Cl. ......... 375/240.06; 375/240.01; 375/240.03; 375/240.16; 348/14.07; 382/236; 382/239
(58) Field of Classification Search ............. 375/240.01, 375/240.03, 240.06, 240.16; 348/14.07; 382/236, 239
See application file for complete search history.

(56) References Cited

U.S. PATENT DOCUMENTS

| | | | |
|---|---|---|---|
| 762,026 A | 6/1904 | Connstein | |
| 4,334,244 A | 6/1982 | Chan et al. | |
| 4,460,924 A | 7/1984 | Lippel | |
| 4,583,114 A | 4/1986 | Catros | |
| 4,679,079 A | 7/1987 | Catros et al. | |
| 4,774,574 A | 9/1988 | Daly et al. | |
| 4,821,119 A | 4/1989 | Gharavi | |
| 4,849,812 A | 7/1989 | Borgers et al. | |
| 4,862,264 A | 8/1989 | Wells et al. | |
| 4,965,830 A | 10/1990 | Barham et al. | |
| 4,992,889 A | 2/1991 | Yamagami et al. | |
| 5,072,295 A | 12/1991 | Murakami et al. | |
| 5,089,889 A | 2/1992 | Sugiyama | |
| 5,128,758 A | 7/1992 | Azadegan et al. | |
| 5,136,377 A | 8/1992 | Johnston et al. | |
| 5,144,426 A | 9/1992 | Tanaka et al. | |
| 5,179,442 A | 1/1993 | Azadegan et al. | |
| 5,237,410 A | 8/1993 | Inoue | |
| 5,241,395 A | 8/1993 | Chen | |
| 5,253,058 A | 10/1993 | Gharavi | |
| 5,263,088 A | 11/1993 | Hazu et al. | |

(Continued)

FOREIGN PATENT DOCUMENTS

| | | |
|---|---|---|
| CA | 1327074 | 2/1994 |

(Continued)

OTHER PUBLICATIONS

Eleftheriadis, "Dynamic rate shaping of Compressed digital video", 2006, Multimedia, IEEE, vol. 8, pp. 297-314.*

(Continued)

*Primary Examiner* — Thanhnga B Truong
*Assistant Examiner* — Gregory Lane
(74) *Attorney, Agent, or Firm* — Klarquist Sparkman, LLP

(57) ABSTRACT

Multiple-pass video encoding systems and techniques are described which utilize statistics taken during a first-pass encoding to create complexity measurements for video data which is to be encoded. By analyzing these complexity measurements, preprocessing decisions, such as, for example, the determination of strength of denoise filters, can be made with greater accuracy. In one implementation, these complexity measurements take the form of calculation of temporal and spatial complexity parameters, which are then used to compute a unified complexity parameter for each group of pictures being encoded.

17 Claims, 11 Drawing Sheets

Two-Pass Encoding Example 100

U.S. PATENT DOCUMENTS

| | | |
|---|---|---|
| 5,289,283 A | 2/1994 | Hopper et al. |
| 5,301,242 A | 4/1994 | Gonzales et al. |
| 5,303,058 A | 4/1994 | Fukuda et al. |
| 5,317,396 A | 5/1994 | Fujinami |
| 5,317,672 A | 5/1994 | Crossman et al. |
| 5,333,212 A | 7/1994 | Ligtenberg |
| 5,351,310 A | 9/1994 | Califano et al. |
| 5,374,958 A | 12/1994 | Yanagihara |
| 5,412,429 A | 5/1995 | Glover |
| 5,452,104 A | 9/1995 | Lee |
| 5,461,421 A | 10/1995 | Moon |
| 5,467,134 A | 11/1995 | Laney et al. |
| 5,473,377 A | 12/1995 | Kim |
| 5,481,553 A | 1/1996 | Suzuki et al. |
| 5,506,916 A | 4/1996 | Nishihara et al. |
| 5,509,089 A | 4/1996 | Ghoshal |
| 5,510,785 A | 4/1996 | Segawa et al. |
| 5,537,440 A | 7/1996 | Eyuboglu et al. |
| 5,537,493 A | 7/1996 | Wilkinson |
| 5,539,469 A | 7/1996 | Jung |
| 5,544,286 A | 8/1996 | Laney |
| 5,559,557 A | 9/1996 | Kato |
| 5,565,920 A | 10/1996 | Lee et al. |
| 5,585,861 A | 12/1996 | Taniguchi et al. |
| 5,587,708 A | 12/1996 | Chiu |
| 5,604,856 A | 2/1997 | Guenter et al. |
| 5,606,371 A | 2/1997 | Gunnewiek et al. |
| 5,611,038 A | 3/1997 | Shaw et al. |
| 5,623,424 A | 4/1997 | Azadegan et al. |
| 5,625,714 A | 4/1997 | Fukuda |
| 5,631,644 A | 5/1997 | Katata et al. |
| 5,646,691 A | 7/1997 | Yokoyama |
| 5,654,760 A | 8/1997 | Ohtsuki |
| 5,657,087 A | 8/1997 | Jeong et al. |
| 5,663,763 A | 9/1997 | Yagasaki et al. |
| 5,724,097 A | 3/1998 | Hibi et al. |
| 5,724,456 A | 3/1998 | Boyack et al. |
| 5,731,836 A | 3/1998 | Lee |
| 5,731,837 A | 3/1998 | Hurst, Jr. |
| 5,739,861 A | 4/1998 | Music |
| 5,751,358 A | 5/1998 | Suzuki et al. |
| 5,751,379 A | 5/1998 | Markandey et al. |
| 5,761,088 A | 6/1998 | Hulyalkar et al. |
| 5,764,803 A | 6/1998 | Jacquin et al. |
| 5,781,788 A | 7/1998 | Woo et al. |
| 5,786,856 A | 7/1998 | Hall et al. |
| 5,787,203 A | 7/1998 | Lee et al. |
| 5,799,113 A | 8/1998 | Lee |
| 5,802,213 A | 9/1998 | Gardos |
| 5,809,178 A | 9/1998 | Anderson et al. |
| 5,815,097 A | 9/1998 | Schwartz et al. |
| 5,819,035 A | 10/1998 | Devaney et al. |
| 5,825,310 A | 10/1998 | Tsutsui |
| 5,835,145 A | 11/1998 | Ouyang et al. |
| 5,835,149 A | 11/1998 | Astle |
| 5,835,237 A | 11/1998 | Ebrahimi |
| 5,835,495 A | 11/1998 | Ferriere |
| 5,844,613 A | 12/1998 | Chaddha |
| 5,850,482 A | 12/1998 | Meany et al. |
| 5,867,167 A | 2/1999 | Deering |
| 5,870,435 A | 2/1999 | Choi et al. |
| 5,877,813 A | 3/1999 | Lee et al. |
| 5,878,166 A | 3/1999 | Legall |
| 5,880,775 A | 3/1999 | Ross |
| 5,883,672 A | 3/1999 | Suzuki et al. |
| 5,905,504 A | 5/1999 | Barkans et al. |
| 5,923,784 A | 7/1999 | Rao et al. |
| 5,926,209 A | 7/1999 | Glatt |
| 5,926,791 A | 7/1999 | Ogata et al. |
| 5,946,419 A | 8/1999 | Chen et al. |
| 5,959,693 A | 9/1999 | Wu et al. |
| 5,969,764 A | 10/1999 | Sun et al. |
| 5,970,173 A | 10/1999 | Lee et al. |
| 5,990,957 A | 11/1999 | Ryo |
| 6,026,190 A | 2/2000 | Astle |
| 6,044,115 A | 3/2000 | Horiike et al. |
| 6,049,630 A | 4/2000 | Wang et al. |
| 6,058,362 A | 5/2000 | Malvar |
| 6,072,831 A | 6/2000 | Chen |
| 6,084,636 A | 7/2000 | Sugahara et al. |
| 6,088,392 A | 7/2000 | Rosenberg |
| 6,091,777 A | 7/2000 | Guetz et al. |
| 6,104,751 A | 8/2000 | Artieri |
| 6,115,420 A | 9/2000 | Wang |
| 6,115,689 A | 9/2000 | Malvar |
| 6,118,817 A | 9/2000 | Wang |
| 6,118,903 A | 9/2000 | Liu |
| 6,125,140 A | 9/2000 | Wilkinson |
| 6,125,147 A | 9/2000 | Florencio et al. |
| 6,148,107 A | 11/2000 | Ducloux et al. |
| 6,148,109 A | 11/2000 | Boon et al. |
| 6,160,846 A | 12/2000 | Chiang et al. |
| 6,167,091 A | 12/2000 | Okada et al. |
| 6,182,034 B1 | 1/2001 | Malvar |
| 6,212,232 B1 | 4/2001 | Reed et al. |
| 6,215,905 B1 | 4/2001 | Lee et al. |
| 6,219,838 B1 | 4/2001 | Cherichetti et al. |
| 6,223,162 B1 | 4/2001 | Chen et al. |
| 6,240,135 B1 | 5/2001 | Kim |
| 6,240,380 B1 | 5/2001 | Malvar |
| 6,243,497 B1 | 6/2001 | Chiang et al. |
| 6,249,614 B1 | 6/2001 | Kolesnik et al. |
| 6,256,422 B1 | 7/2001 | Mitchell et al. |
| 6,256,423 B1 | 7/2001 | Krishnamurthy |
| 6,263,022 B1 | 7/2001 | Chen et al. |
| 6,263,024 B1 | 7/2001 | Matsumoto |
| 6,275,614 B1 | 8/2001 | Krishnamurthy et al. |
| 6,278,735 B1 | 8/2001 | Mohsenian |
| 6,281,942 B1 | 8/2001 | Wang |
| 6,292,588 B1 | 9/2001 | Shen et al. |
| 6,314,208 B1 | 11/2001 | Konstantinides et al. |
| 6,337,881 B1 | 1/2002 | Chaddha |
| 6,347,116 B1 | 2/2002 | Haskell et al. |
| 6,348,945 B1 | 2/2002 | Hayakawa |
| 6,356,709 B1 | 3/2002 | Abe et al. |
| 6,359,928 B1 | 3/2002 | Wang et al. |
| 6,360,017 B1 | 3/2002 | Chiu et al. |
| 6,370,502 B1 | 4/2002 | Wu et al. |
| 6,373,894 B1 | 4/2002 | Florencio et al. |
| 6,380,985 B1 | 4/2002 | Callahan |
| 6,385,343 B1 | 5/2002 | Kuroda et al. |
| 6,389,171 B1 | 5/2002 | Washington |
| 6,393,155 B1 | 5/2002 | Bright et al. |
| 6,408,026 B1 | 6/2002 | Tao |
| 6,418,166 B1 | 7/2002 | Wu et al. |
| 6,438,167 B1 | 8/2002 | Shimizu et al. |
| 6,456,744 B1 | 9/2002 | Lafe |
| 6,463,100 B1 | 10/2002 | Cho et al. |
| 6,466,620 B1 | 10/2002 | Lee |
| 6,473,409 B1 | 10/2002 | Malvar |
| 6,473,534 B1 | 10/2002 | Merhav et al. |
| 6,490,319 B1 | 12/2002 | Yang |
| 6,493,385 B1 | 12/2002 | Sekiguchi et al. |
| 6,519,284 B1 | 2/2003 | Pesquet-Popescu et al. |
| 6,526,096 B2 | 2/2003 | Lainema et al. |
| 6,546,049 B1 | 4/2003 | Lee |
| 6,556,925 B1 | 4/2003 | Mori et al. |
| 6,571,019 B1 | 5/2003 | Kim et al. |
| 6,593,925 B1 | 7/2003 | Hakura et al. |
| 6,600,836 B1 | 7/2003 | Thyagarajan et al. |
| 6,625,215 B1 | 9/2003 | Faryar et al. |
| 6,647,152 B2 | 11/2003 | Willis et al. |
| 6,654,417 B1 | 11/2003 | Hui |
| 6,678,422 B1 | 1/2004 | Sharma et al. |
| 6,687,294 B2 | 2/2004 | Yan et al. |
| 6,704,718 B2 | 3/2004 | Burges et al. |
| 6,721,359 B1 | 4/2004 | Bist et al. |
| 6,728,317 B1 | 4/2004 | Demos |
| 6,731,811 B1 | 5/2004 | Rose |
| 6,738,423 B1 | 5/2004 | Lainema et al. |
| 6,747,660 B1 | 6/2004 | Olano et al. |
| 6,759,999 B1 | 7/2004 | Doyen |
| 6,760,482 B1 | 7/2004 | Taubman |
| 6,765,962 B1 | 7/2004 | Lee et al. |
| 6,771,830 B2 | 8/2004 | Goldstein et al. |
| 6,785,331 B1 | 8/2004 | Jozawa et al. |
| 6,788,740 B1 | 9/2004 | Van der Schaar et al. |

| | | |
|---|---|---|
| 6,792,157 B1 | 9/2004 | Koshi et al. |
| 6,795,584 B2 | 9/2004 | Karczewicz et al. |
| 6,801,572 B2 | 10/2004 | Yamada et al. |
| 6,807,317 B2 | 10/2004 | Mathew et al. |
| 6,810,083 B2 | 10/2004 | Chen et al. |
| 6,831,947 B2 | 12/2004 | Ribas Corbera |
| 6,862,320 B1 | 3/2005 | Isu et al. |
| 6,865,291 B1 | 3/2005 | Zador |
| 6,873,368 B1 | 3/2005 | Yu et al. |
| 6,873,654 B1 | 3/2005 | Rackett |
| 6,876,703 B2 | 4/2005 | Ismaeil et al. |
| 6,882,753 B2 | 4/2005 | Chen et al. |
| 6,907,142 B2 | 6/2005 | Kalevo et al. |
| 6,909,745 B1 | 6/2005 | Puri et al. |
| 6,947,045 B1 | 9/2005 | Ostermann et al. |
| 6,975,680 B2 | 12/2005 | Demos |
| 6,977,659 B2 | 12/2005 | Dumitras et al. |
| 6,980,595 B2 | 12/2005 | Rose et al. |
| 6,983,018 B1 | 1/2006 | Lin et al. |
| 6,990,242 B2 | 1/2006 | Malvar |
| 6,992,725 B2 | 1/2006 | Mohsenian |
| 7,016,546 B2 | 3/2006 | Fukuhara et al. |
| 7,020,204 B2 | 3/2006 | Auvray et al. |
| 7,027,506 B2 | 4/2006 | Lee et al. |
| 7,027,507 B2 | 4/2006 | Wu |
| 7,035,473 B1 | 4/2006 | Zeng et al. |
| 7,042,941 B1 | 5/2006 | Laksono et al. |
| 7,058,127 B2 | 6/2006 | Lu et al. |
| 7,072,525 B1 | 7/2006 | Covell |
| 7,099,389 B1 | 8/2006 | Yu et al. |
| 7,099,515 B2 | 8/2006 | Lin et al. |
| 7,110,455 B2 | 9/2006 | Wu et al. |
| 7,158,668 B2 | 1/2007 | Munsil et al. |
| 7,162,096 B1 | 1/2007 | Horowitz |
| 7,200,277 B2 | 4/2007 | Joshi et al. |
| 7,233,362 B2 | 6/2007 | Wu |
| 7,289,154 B2 | 10/2007 | Gindele |
| 7,295,609 B2 | 11/2007 | Sato et al. |
| 7,301,999 B2 | 11/2007 | Filippini et al. |
| 7,307,639 B1 | 12/2007 | Dumitras et al. |
| 7,308,151 B2 | 12/2007 | Munsil et al. |
| 7,356,085 B2 | 4/2008 | Gavrilescu et al. |
| 7,463,780 B2 | 12/2008 | Fukuhara et al. |
| 7,471,830 B2 | 12/2008 | Lim et al. |
| 7,570,834 B2 | 8/2009 | Deshpande |
| 7,580,584 B2 | 8/2009 | Holcomb et al. |
| 7,738,554 B2 | 6/2010 | Lin et al. |
| 7,778,476 B2 | 8/2010 | Alvarez et al. |
| 7,801,383 B2 | 9/2010 | Sullivan |
| 7,869,517 B2 | 1/2011 | Ghanbari |
| 7,889,790 B2 | 2/2011 | Sun |
| 7,995,649 B2 | 8/2011 | Zuo et al. |
| 2001/0048718 A1 | 12/2001 | Bruls et al. |
| 2002/0021756 A1 | 2/2002 | Jayant et al. |
| 2002/0044602 A1 | 4/2002 | Ohki |
| 2002/0118748 A1 | 8/2002 | Inomata et al. |
| 2002/0118884 A1 | 8/2002 | Cho et al. |
| 2002/0136297 A1 | 9/2002 | Shimada et al. |
| 2002/0136308 A1 | 9/2002 | Le Maguet et al. |
| 2002/0154693 A1 | 10/2002 | Demos et al. |
| 2002/0186890 A1 | 12/2002 | Lee et al. |
| 2003/0021482 A1 | 1/2003 | Lan et al. |
| 2003/0053702 A1 | 3/2003 | Hu |
| 2003/0058944 A1 | 3/2003 | MacInnis et al. |
| 2003/0095599 A1 | 5/2003 | Lee et al. |
| 2003/0103677 A1 | 6/2003 | Tastl et al. |
| 2003/0108100 A1 | 6/2003 | Sekiguchi et al. |
| 2003/0113026 A1 | 6/2003 | Srinivasan et al. |
| 2003/0128754 A1 | 7/2003 | Akimoto et al. |
| 2003/0128756 A1 | 7/2003 | Oktem |
| 2003/0138150 A1 | 7/2003 | Srinivasan |
| 2003/0185420 A1 | 10/2003 | Sefcik et al. |
| 2003/0194010 A1 | 10/2003 | Mukerjee et al. |
| 2003/0206582 A1 | 11/2003 | Srinivasan et al. |
| 2003/0215011 A1 | 11/2003 | Wang et al. |
| 2003/0219073 A1 | 11/2003 | Lee et al. |
| 2003/0223493 A1 | 12/2003 | Ye et al. |
| 2003/0235247 A1 * | 12/2003 | Wu et al. .................. 375/240.03 |
| 2004/0008901 A1 | 1/2004 | Avinash |
| 2004/0022316 A1 | 2/2004 | Ueda et al. |
| 2004/0036692 A1 | 2/2004 | Alcorn et al. |
| 2004/0090397 A1 | 5/2004 | Doyen et al. |
| 2004/0091168 A1 | 5/2004 | Jones et al. |
| 2004/0151243 A1 | 8/2004 | Bhaskaran et al. |
| 2004/0158719 A1 | 8/2004 | Lee et al. |
| 2004/0170395 A1 | 9/2004 | Filippini et al. |
| 2004/0174464 A1 | 9/2004 | MacInnis et al. |
| 2004/0190610 A1 | 9/2004 | Song et al. |
| 2004/0202376 A1 | 10/2004 | Schwartz et al. |
| 2004/0228406 A1 | 11/2004 | Song |
| 2004/0264568 A1 | 12/2004 | Florencio |
| 2004/0264580 A1 | 12/2004 | Chiang Wei Yin et al. |
| 2005/0002575 A1 | 1/2005 | Joshi et al. |
| 2005/0008075 A1 | 1/2005 | Chang et al. |
| 2005/0013365 A1 | 1/2005 | Mukerjee et al. |
| 2005/0013497 A1 | 1/2005 | Hsu et al. |
| 2005/0013498 A1 | 1/2005 | Srinivasan et al. |
| 2005/0013500 A1 | 1/2005 | Lee et al. |
| 2005/0015246 A1 | 1/2005 | Thumpudi et al. |
| 2005/0015259 A1 | 1/2005 | Thumpudi et al. |
| 2005/0021579 A1 | 1/2005 | Bae et al. |
| 2005/0024487 A1 | 2/2005 | Chen |
| 2005/0031034 A1 | 2/2005 | Kamaci et al. |
| 2005/0036698 A1 | 2/2005 | Beom |
| 2005/0036699 A1 | 2/2005 | Holcomb et al. |
| 2005/0041738 A1 | 2/2005 | Lin et al. |
| 2005/0052294 A1 | 3/2005 | Liang et al. |
| 2005/0053151 A1 | 3/2005 | Lin et al. |
| 2005/0053158 A1 | 3/2005 | Regunathan et al. |
| 2005/0084009 A1 | 4/2005 | Furukawa et al. |
| 2005/0084013 A1 | 4/2005 | Wang et al. |
| 2005/0094731 A1 | 5/2005 | Xu et al. |
| 2005/0105612 A1 | 5/2005 | Sung et al. |
| 2005/0105622 A1 | 5/2005 | Gokhale |
| 2005/0105889 A1 | 5/2005 | Conklin |
| 2005/0123274 A1 | 6/2005 | Crinon et al. |
| 2005/0135484 A1 | 6/2005 | Lee et al. |
| 2005/0147163 A1 | 7/2005 | Li et al. |
| 2005/0152448 A1 | 7/2005 | Crinon et al. |
| 2005/0152451 A1 | 7/2005 | Byun |
| 2005/0180500 A1 | 8/2005 | Chiang et al. |
| 2005/0180502 A1 | 8/2005 | Puri |
| 2005/0190836 A1 | 9/2005 | Lu et al. |
| 2005/0207492 A1 | 9/2005 | Pao |
| 2005/0232501 A1 | 10/2005 | Mukerjee |
| 2005/0238096 A1 | 10/2005 | Holcomb et al. |
| 2005/0254719 A1 | 11/2005 | Sullivan |
| 2005/0259729 A1 | 11/2005 | Sun |
| 2005/0276493 A1 | 12/2005 | Xin et al. |
| 2006/0013307 A1 | 1/2006 | Olivier et al. |
| 2006/0013309 A1 | 1/2006 | Ha et al. |
| 2006/0018552 A1 | 1/2006 | Malayath et al. |
| 2006/0034368 A1 | 2/2006 | Klivington |
| 2006/0038826 A1 | 2/2006 | Daly |
| 2006/0056508 A1 | 3/2006 | Lafon et al. |
| 2006/0071825 A1 | 4/2006 | Demos |
| 2006/0083300 A1 | 4/2006 | Han et al. |
| 2006/0083308 A1 | 4/2006 | Schwarz et al. |
| 2006/0088098 A1 | 4/2006 | Vehvilainen |
| 2006/0098733 A1 | 5/2006 | Matsumura et al. |
| 2006/0104350 A1 | 5/2006 | Liu |
| 2006/0104527 A1 | 5/2006 | Koto et al. |
| 2006/0126724 A1 | 6/2006 | Cote |
| 2006/0126728 A1 * | 6/2006 | Yu et al. .................. 375/240.03 |
| 2006/0133478 A1 | 6/2006 | Wen |
| 2006/0133479 A1 | 6/2006 | Chen et al. |
| 2006/0133689 A1 | 6/2006 | Andersson et al. |
| 2006/0140267 A1 | 6/2006 | He et al. |
| 2006/0165176 A1 * | 7/2006 | Raveendran et al. .... 375/240.16 |
| 2006/0188014 A1 | 8/2006 | Civanlar et al. |
| 2006/0197777 A1 | 9/2006 | Cha et al. |
| 2006/0227868 A1 | 10/2006 | Chen et al. |
| 2006/0238444 A1 | 10/2006 | Wang et al. |
| 2006/0239576 A1 | 10/2006 | Mukherjee |
| 2006/0245506 A1 | 11/2006 | Lin et al. |
| 2006/0256851 A1 | 11/2006 | Wang et al. |
| 2006/0256867 A1 | 11/2006 | Turaga et al. |
| 2006/0257037 A1 | 11/2006 | Samadani |

| | | | |
|---|---|---|---|
| 2006/0268990 A1 | 11/2006 | Lin et al. | |
| 2006/0268991 A1 | 11/2006 | Segall et al. | |
| 2006/0274959 A1 | 12/2006 | Piastowski | |
| 2007/0002946 A1* | 1/2007 | Bouton et al. | 375/240.01 |
| 2007/0009039 A1 | 1/2007 | Ryu | |
| 2007/0009042 A1 | 1/2007 | Craig et al. | |
| 2007/0053603 A1 | 3/2007 | Monro | |
| 2007/0081588 A1 | 4/2007 | Raveendran et al. | |
| 2007/0091997 A1 | 4/2007 | Fogg et al. | |
| 2007/0140333 A1 | 6/2007 | Chono et al. | |
| 2007/0140354 A1 | 6/2007 | Sun | |
| 2007/0147497 A1 | 6/2007 | Bao et al. | |
| 2007/0160126 A1 | 7/2007 | Van Der Meer et al. | |
| 2007/0160138 A1 | 7/2007 | Wedi et al. | |
| 2007/0160151 A1 | 7/2007 | Bolton et al. | |
| 2007/0189626 A1 | 8/2007 | Tanizawa et al. | |
| 2007/0201553 A1 | 8/2007 | Shindo | |
| 2007/0230565 A1* | 10/2007 | Tourapis et al. | 375/240.01 |
| 2007/0237221 A1 | 10/2007 | Hsu et al. | |
| 2007/0237222 A1 | 10/2007 | Xia et al. | |
| 2007/0237236 A1 | 10/2007 | Chang et al. | |
| 2007/0237237 A1 | 10/2007 | Chang et al. | |
| 2007/0248163 A1 | 10/2007 | Zuo et al. | |
| 2007/0248164 A1 | 10/2007 | Zuo et al. | |
| 2007/0258518 A1 | 11/2007 | Tu et al. | |
| 2007/0258519 A1 | 11/2007 | Srinivasan | |
| 2007/0268964 A1 | 11/2007 | Zhao | |
| 2008/0008249 A1 | 1/2008 | Yan | |
| 2008/0008394 A1 | 1/2008 | Segall | |
| 2008/0013630 A1 | 1/2008 | Li et al. | |
| 2008/0024513 A1 | 1/2008 | Raveendran | |
| 2008/0031346 A1 | 2/2008 | Segall | |
| 2008/0068446 A1* | 3/2008 | Barkley et al. | 348/14.07 |
| 2008/0080615 A1 | 4/2008 | Tourapis et al. | |
| 2008/0089410 A1 | 4/2008 | Lu et al. | |
| 2008/0089417 A1 | 4/2008 | Bao et al. | |
| 2008/0095235 A1 | 4/2008 | Hsiang | |
| 2008/0101465 A1 | 5/2008 | Chono et al. | |
| 2008/0165848 A1 | 7/2008 | Ye et al. | |
| 2008/0187042 A1* | 8/2008 | Jasinschi | 375/240.03 |
| 2008/0240235 A1 | 10/2008 | Holcomb et al. | |
| 2008/0240250 A1 | 10/2008 | Lin et al. | |
| 2008/0240257 A1 | 10/2008 | Chang et al. | |
| 2008/0260278 A1 | 10/2008 | Zuo et al. | |
| 2008/0304562 A1 | 12/2008 | Chang et al. | |
| 2009/0003718 A1 | 1/2009 | Liu et al. | |
| 2009/0161756 A1 | 6/2009 | Lin | |
| 2009/0207912 A1 | 8/2009 | Holcomb et al. | |
| 2009/0207919 A1 | 8/2009 | Yin et al. | |
| 2009/0213930 A1 | 8/2009 | Ye et al. | |
| 2009/0219994 A1 | 9/2009 | Tu et al. | |
| 2009/0245587 A1 | 10/2009 | Holcomb et al. | |
| 2009/0262798 A1 | 10/2009 | Chiu et al. | |
| 2009/0290635 A1 | 11/2009 | Kim et al. | |
| 2009/0296808 A1 | 12/2009 | Regunathan et al. | |
| 2010/0177826 A1 | 7/2010 | Bhaumik et al. | |

FOREIGN PATENT DOCUMENTS

| | | |
|---|---|---|
| EP | 0932306 | 7/1999 |
| EP | 1465349 | 10/2004 |
| EP | 1871113 | 12/2007 |
| GB | 897363 | 5/1962 |
| GB | 1 218 015 | 1/1971 |
| JP | 05-227525 | 9/1993 |
| JP | 07-222145 | 8/1995 |
| JP | 07-250327 | 9/1995 |
| JP | 08-336139 | 12/1996 |
| JP | 10-336656 | 12/1998 |
| JP | 11-041610 | 2/1999 |
| JP | 6-296275 | 10/2004 |
| JP | 2007-281949 | 10/2007 |
| KR | 132895 | 10/1998 |
| WO | WO 94/03988 | 2/1994 |
| WO | WO 97/21302 | 6/1997 |
| WO | WO 99/48300 | 9/1999 |
| WO | WO 00/21207 | 4/2000 |
| WO | WO 00/72599 | 11/2000 |
| WO | WO 02/07438 | 1/2002 |
| WO | JP 2003061090 | 2/2003 |
| WO | WO 2004/100554 | 11/2004 |
| WO | WO 2004/100556 | 11/2004 |
| WO | WO 2005/065030 | 7/2005 |
| WO | WO 2005/076614 | 8/2005 |
| WO | WO 2006/075895 | 7/2006 |
| WO | WO 2006/079997 | 8/2006 |
| WO | WO 2006/112620 | 10/2006 |
| WO | WO 2007/008286 | 1/2007 |
| WO | WO 2007/009875 | 1/2007 |
| WO | WO 2007/015047 | 2/2007 |
| WO | WO 2007/018669 | 2/2007 |
| WO | WO 2007/042365 | 4/2007 |
| WO | WO 2007/130580 A2 | 11/2007 |

OTHER PUBLICATIONS

Golston et al., "Video codecs tutorial: Trade-offs with H.264, VC-1 and other advanced codecs," *Video/Imaging Design Line*, Mar. 2006, 9 pages.

Huang et al., "A Frame-Based MPEG Characteristics Extraction Tool and Its Application in Video Transcoding," *IEEE Transactions on Consumer Electronics*, vol. 48, No. 3, Aug. 2002, pp. 522-532.

Shanableh et al., "Heterogeneous Video Transcoding to Lower Spatio-Temporal Resolutions and Different Encoding Formats," *IEEE Transactions on Multimedia*, vol. 2, No. 2, Jun. 2000, pp. 101-110.

Shen et al., "Rate-Distortion Optimization for Fast Hierarchical B-Picture Transcoding," *IEEE*, 2006, pp. 5279-5282.

Zhang et al., "Adaptive Field/Frame Selection for High Compression Coding," *SPIE Conf. on Image and Video Communications and Processing*, Jan. 2003, 13 pages.

Augustine et al., "Region of Interest Editing of MPEG-2 Video Streams in the Compressed Domain," 2004 IEEE Int'l Conf. on Multimedia and Expo: ICME'04. vol. 1, Issue 27-30, pp. 559-562 (Jun. 2004).

Golner et al., "Region Based Variable Quantization for JPEG Image Compression," IEEE Symp. on Circuits and Systems, pp. 604-607 (Aug. 2000).

Hannuksela et al., "Sub-picture: ROI coding and unequal error protection," Proc. 2002 Int'l Conf. on Image Processing, vol. 3, Issue 24-28, pp. 537-540 (Jun. 2002) (http://ieeexplore.ieee.org/Xplore/login.jsp?url=/iel5/8052/22267/01039026.pdf).

Lei et al., "Rate Adaptation Transcoding for Precoded Video Streams," 13 pp. (2000).

Lin et al, "Low-complexity face-assisted coding scheme for low bit rate video telephony," IEICE Trans. Inf. & Sys., vol. E86-D, No. 1, pp. 101-108 (2003).

Lin et al, "Low-complexity face-assisted video coding," Proc. 2000 Int'l Conf. on Image Processing, vol. 2, pp. 207-210 (2000) (http://ieeexplore.ieee.org/Xplore/login.jsp?url=/iel5/7221/19473/00899270.pdf).

Schallauer et al., "PRESTO—Preservation Technologies for European Broadcast Archives, D5.4—High Quality Compression for Film and Video," 80 pp. (Sep. 18, 2002).

De Simone, et al., "A comparative study of JPEG 2000, AVC/H.264, and HD Photo," http://infoscience.epfl.ch/getfile.py?docid=14194&name=FirstPaper&format=pdf&version=1, 12 pages, downloaded from the World Wide Web (2007).

International Search Report of the International Searching Authority, mailed Nov. 1, 2007, for International Patent Application No. PCT/US2007/010848.

Radha, et al., "The MPEG-4 Fine-Grained Scalable Video Coding Method for Multimedia Streaming Over IP," http://citeseer.ist.psu.edu/cache/papers/cs/33041/http:zSzzSzwww.egr.msu.eduzSzwaveszSzpeoplezSzRadha_fileszSz2001zSzieee_tmm_MP4_FGS_00909594.pdf/radha01mpeg.pdf, 16 pages, downloaded from the World Wide Web (2001).

Wang, et al., "A Framework for Adaptive Scalable Video Coding Using Wyner-Ziv Techniques," http://www-scf.usc.edu/~huishenw/Pubs/HuishengWangJASP06.pdf, 18 pages, downloaded from the World Wide Web (2006).

Atzori et al., "Adaptive Anisotropic Filtering (AAF) for Real-Time Visual Enhancement of MPEG-Coded Video Sequences," *IEEE Transactions on Circuits and Systems for Video Technology*, vol. 12, No. 5, pp. 285-298 (May 2002).

Bist et al., "Adaptive Quantization for Low Bit Rate Video Coding," *Proc. 1998 Int'l Conf. on Image Processing (ICIP 98)*, pp. 925-928 (1998).

Braun et al., "Motion-Compensating Real-Time Format Converter for Video on Multimedia Displays," *Proceedings IEEE 4th International Conference on Image Processing*, vol. I, pp. 125-128 (1997).

Defee et al., "Nonlinear Filters in Image Pyramid Generation," *IEEE International Conference on Systems Engineering*, pp. 269-272 (1991).

Elad et al., "Super-Resolution Restoration of an Image Sequence—Adaptive Filtering Approach," 24 pp. retrieved from http://citeseer.nj.nec.com/342620.html on Apr. 30, 2001.

Farvardin et al., "Optimum quantizer performance for a class of non-Gaussian memoryless sources," IEEE Trans. Inform. Theory, vol. IT-30, No. 3, pp. 485-497 (May 1984).

Flierl et al., "A Video Codec Incorporating Block-Based Multi-Hypothesis Motion-Compensated Prediction," in Proceedings of the SPIE Conference on Visual Communications and image Processing, Perth, Australia, vol. 4067, pp. 238-249 (Jun. 2000).

Flierl et al., "Generalized B Pictures and the Draft H.264/AVC Video Compression Standard," in IEEE Transactions on Circuits and Systems for Video Technology, vol. 13, No. 7, pp. 587-597 (Jul. 2003).

Foos et al., "JPEG 2000 compression of medical imagery," *Proc. SPIE*, vol. 3980, pp. 85-96 (2000).

Garrigues et al., "Atom position coding in a matching pursuit based video coder," *Lecture Notes in Computer Science*, 4 pp. (2005).

Gish et al., "Asymptotically efficient quantizing," *IEEE Trans. Inform. Theory*, vol. IT-14, No. 5 (Sep. 1968).

"H.264 & IPTV Over DSL—Enabling New Telco Revenue Opportunities," White Paper, Intel/Envivio, May 15, 2004, available at http://www.envivio.com/images/products/H264whitepaper.pdf.

Haddad et al., "Digital Signal: Theory, Applications, and Hardware," *Computer Science Press*, pp. 257-261 (1991).

Hsia et al., "A Parallel Median Filter with Pipelined Scheduling for Real-Time 1D and 2D Signal Processing," *IEICE Trans. Fundamentals*, vol. E83-A, No. 7, pp. 1396-1404 (Jul. 2000).

Impoco, "JPEG2000—a Short Tutorial," 16 pp. (2004).

International Organization for Standardization,"MPEG-4 Video Verification Model version 18.0," ISO/IEC JTC1/SC29/WG11 N3908, pp. 1-10, 299-311 (Jan. 2001).

"ISO/IEC 11172-2 Coding of moving pictures and associated audio for digital storage media at up to about 1.5 Mbit/s," MPEG (Moving Pictures Expert Group), International Organization for Standardization, MPEG1 Video, 122 pp. (1993).

"ISO/IEC 13818-2. Generic coding of moving pictures and associated audio information," MPEG (Moving Pictures Expert Group), International Organization for Standardization, MPEG2 Video (1994).

ISO/IEC, "14496-2: Information Technology—Coding of Audio-Visual Objects—Part 2: Visual," 724 pp. (2004).

ITU-T, "ITU-T Recommendation H.261: Video Codec for Audiovisual Services at $p \times 64$ kbits," 28 pp. (1993).

ITU-T, "ITU-T Recommendation H.262: Information Technology—Generic Coding of Moving Pictures and Associated Audio Information: Video," 218 pp. (1995).

ITU-T, "ITU-T Recommendation H.263: Video Coding for Low Bit Rate Communication," 167 pp. (1998).

Joint Video Team (JVT) of ISO/IEC MPEG & ITU-T VCEG, "Draft ITU-T Recommendation and Final Draft International Standard of Joint Video Specification (ITU-T Rec. H.264 ISO/IEC 14496-10 AVC," 253 pp. (May 2003).

Joshi et al., "Comparison of generalized Gaussian and Laplacian modeling in DCT image coding," *IEEE Signal Proc. Letters*, vol. SPL-2, No. 5, pp. 81-82 (May 1995).

"JPEG 2000," EEE 508—Lecture 18, 25 pp.

Kim et al., "Spatio-temporal Adaptive 3-D Kalman Filter for Video," *IEEE Trans. on Image Process.*, vol. 6, No. 3, pp. 414-423 (Mar. 1997) (12 pp. printout).

Kim et al., "Still image coding based on vector quantization and fractal approximation," IEEE Transactions on Image Processing, vol. 5, No. 4, pp. 587-597 (1996).

Kopp et al., "Efficient 3×3 Median Filter Computations," *Institute of Computer Graphics and Algorithms*, Vienna University of Technology, Technical Report TR-186-2-94-18, 4 pp. (1994).

Kopp, "Lossless Wavelet Based Image Compression with Adaptive 2D Decomposition", Proceedings of the Fourth International Conference in Central Europe on Computer Graphics and Visualization 96, (WSCG96), pp. 141-149 Czech Republic (Feb. 12-16, 1996).

Kotropoulos et al., "Adaptive LMS $L$-filters for Noise Suppression in Images," *IEEE Transactions on Image Processing*, vol. 5, No. 12, pp. 1596-1609 (1996) [48 pp. retrieved from http://citeseer.nj.nec.com/kotropoulos 96adaptive.html on Apr. 30, 2001].

Kwon et al., "Adaptive Bitrate Allocation in Spatial Scalable Video Coding of Fixed Total Bitrate," *IEICE Trans. Fundamentals*, vol. E81-A, No. 5, pp. 950-956 (May 1998).

Lam et al., "A mathematical analysis of the DCT coefficient distributions for images," IEEE Trans. Image Proc., vol. IP-9, No. 10, pp. 1661-1666 (Oct. 2000).

LeGall, "MPEG: A Video Compression Standard for Multimedia Application," Communications of the ACM, vol. 34, No. 4, pp. 47-58 (Apr. 1991).

LeGall, "The MPEG Video Compression Algorithm," *Signal Processing: Image Communication 4*, vol. 4, No. 2, pp. 129-140 (Apr. 1992).

LeGall et al., "Transmission of HDTV signals under 140 Mbit/s using a subband decomposition and Discrete Cosine Transform coding," in *Signal Processing of HDTV*, Elsevier, Amsterdam, pp. 287-293 (1988).

Limb, "A Picture-Coding Algorithm for the Merli Scan," *IEEE Transactions on Communications*, pp. 300-305 (Apr. 1973).

Lloyd, "Least squares quantization in PCM," *IEEE Trans. Inform. Theory*, vol. IT-28, No. 2, pp. 7-12 (Mar. 1982) (reprint of work originally presented in Jul. 1957).

Loomis, "Using the Advanced Settings of the Windows Media Video 9 Advanced Profile Codec," 13 pp. (Document dated Apr. 2006) [Downloaded from the World Wide Web on May 31, 2007].

Lopresto et al., "Image Coding Based on Mixture Modeling of Wavelet Coefficients and a Fast Estimation-Quantization Framework," *Proc. IEEE Data Compression Conference*, (Snowbird, UT), pp. 221-230 (Mar. 1997).

Mallat, "A theory for multiresolution signal decomposition: the wavelet representation," *IEEE Trans. Pattern Anal. and Machine Intell.*, vol. PAMI-11, No. 7, pp. 674-692 (Jul. 1989).

Masala et al., "Perceptually Optimized MPEG Compression of Synthetic Video Sequences," *Proc. ICIP*, pp. I-601-I-604 (2005).

Max, "Quantizing for minimum distortion," *IEEE Trans. Inform. Theory*, vol. IT-6, No. 1, pp. 7-12 (Mar. 1960).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mitra et al., "Two-Stage Color Palettization for Error Diffusion," *Proceedings of SPIE*, pp. 207-217 (Jun. 2002).

Mook, "Next-Gen Windows Media Player Leaks to the Web," *BetaNews*, 17 pp. (Jul. 19, 2002) [Downloaded from the World Wide Web on Aug. 8, 2003].

Muller, "Distribution shape of two-dimensional DCT coefficients of natural images," *IEEE Electronics Letters*, vol. 29, No. 22 (Oct. 1993).

Murakami et al., "Comparison between DPCM and Hadamard transform coding in the composite coding of the NTSC color TV signal," *IEEE Trans. on Commun.*, vol. COM-30, No. 3, pp. 469-479 (Mar. 1982).

Musmann et al., "Advances in Picture Coding," *Proceedings of the IEEE*, vol. 73, No. 4, pp. 523-548 (Apr. 1985).

Neff et al., "Modulus Quantization for Matching Pursuit Video Coding," *IEEE Transactions on Circuits and Systems for Video Technology*, vol. 10, No. 6, pp. 895-912 (Sep. 2000).

Nguyen et al., "Set Theoretic Compression with an Application to Image Coding," *IEEE Transactions on Image Processing*, vol. 7, No. 7, pp. 1051-1056 (Jul. 1998).

Park et al., "A post processing method for reducing quantization effects in low bit-rate moving picture coding," *IEEE Trans. Circuits Syst. Video Technology*, vol. 9, pp. 161-171 (Feb. 1999).

Puri et al., "Motion-Compensated Video Coding with Adaptive Perceptual Quantization," *IEEE Transactions on Circuits and Systems for Video Technology*, vol. 1, No. 4, pp. 351-361 (Dec. 1991).

Ranka et al., "Efficient Serial and Parallel Algorithm for Median Filtering," *IEEE Transactions on Signal Processing*, vol. 39, Issue 6, pp. 1462-1466 (Jun. 1991).

Reeves, "On the Selection of Median Structure for Image Filtering," *IEEE Transactions on Circuits and Systems II: Analog and Digital Signal Processing*, vol. 42, pp. 556-558 (Aug. 1995) (12 pp. printout).

Reininger et al., "Distribution of two-dimensional DCT coefficients for images," *IEEE Trans. on Commun.*, vol. COM-31, No. 6, pp. 835-839 (Jun. 1983).

Ribas Corbera et al., "Rate Control in DCT Video Coding for Low-Delay Communications," *IEEE Transactions on Circuits and Systems for Video Technology*, vol. 9, No. 1, pp. 172-185 (Feb. 1999).

Roosmalen et al., "Noise Reduction of Image Sequences as Preprocessing for MPEG2 Encoding," *Proceedings of EUSIPCO*, 4 pp. (1998).

Russ, "The Image Processing Handbook," 2nd Edition, CRC Press, pp. 164-166 (1994).

Schuster et al., "A Theory for the Optimal Bit Allocation Between Displacement Vector Field and Displaced Frame Difference," IEEE J. on Selected Areas in Comm., vol. 15, No. 9, pp. 1739-1751 (Dec. 1997).

Senel et al., "Topological Median Filters," 44 pp. [Retrieved from http://citeseer.nj.nec.com/277604.html on Apr. 30, 2001].

Shoushun et al., "Adaptive-Quantization Digital Image Sensor for Low-Power Image Compression," in *IEEE Transactions on Circuits and Systems—I: Regular Papers*, vol. 54, No. 1, pp. 13-25 (Jan. 2007).

Sony Electronics Inc., "Sony Vizaro DVD Encoder System DVA-V700," 4 pp. (2001).

Sullivan, "Efficient scalar quantization of exponential and Laplacian random variables," *IEEE Trans. Inform. Theory*, vol. IT-42, No. 5, pp. 1365-1374 (Sep. 1996).

Sullivan et al., "Rate-Distortion Optimization for Video Compression," *IEEE Signal Processing Magazine*, pp. 74-90 (Nov. 1998).

Sullivan et al., "The H.264/AVC Advanced V ideo Coding Standard: Overview and Introduction to the Fidelity Range Extensions," 21 pp. (Aug. 2004).

Tao et al., "Adaptive Model-driven Bit Allocation for MPEG Video Coding," *IEEE Transactions on Circuits and Systems for Video Tech.*, vol. 10, No. 1, pp. 147-157 (Feb. 2000).

Tramini et al., "Intraframe Image Decoding Based on a Nonlinear Variational Approach," *International Journal of Imaging Systems and Technology*, vol. 9, No. 5, pp. 369-380 (1999) (22 pp. prinout).

Tsang et al., "Fuzzy Based Rate Control for Real-Time MPEG Video," IEEE Transactions on Fuzzy Systems, pp. 504-516 (1998).

Tsekeridou et al., "Morphological Signal Adaptive Median Filter for Still Image and Image Sequence Filtering," *IEEE Int. Symposium on Circuits and Systems*, 4 pp. (1998).

Wien, "Variable Block-Size Transforms for Hybrid Video Coding," Dissertation, 182 pp. (Feb. 2004).

Wong, "Nonlinear Scale-Space Filtering and Multiresolution Systems," *IEEE Transactions on Image Processing*, vol. 4, No. 6, pp. 774-787 (Jun. 1995).

Wu et al., "Context-based adaptive lossless codec," *IEEE Trans. Communications*, vol. 45, pp. 437-444 (1997).

Wu et al., "Joint Estimation of Forward and Backward Motion Vectors for Interpolative Prediction of Video," *IEEE Transactions on Image Processing*, vol. 3, No. 5, pp. 684-687 (Sep. 1994).

Xiong et al., "Wavelet Packet Image Coding Using Space-Frequency Quantization", *IEEE Transactions on Image Processing*, vol. 7, No. 6, pp. 892-898 (Jun. 1998).

Yang et al., "Rate Control for Videophone Using Local Perceptual Cues," *IEEE Transactions on Circuits and Systems for Video Tech.*, vol. 15, No. 4, pp. 496-507 (Apr. 2005).

Yli-Harja et al., "Efficient Representation and Implementation of Recursive Median Filters and Their Cascade Compositions," *Proceedings of the Finnish Signal Processing Symposium*, Oulu, Finland, pp. 84-88 (May 1999).

Yli-Harja et al., "Run-length Distributions of Recursive Median Filters Using Probabilistic Automata," *Proceedings of Scandinavian Conference on Image Analysis*, Kangerlussuaq, Greenland, Jun. 7-11, 1999, pp. 251-258 (1999).

Yuen et al., "A survey of hybrid MC/DPCM/DCT video coding distortions," *Signal Processing*, vol. 70, pp. 247-278 (1998).

Zaid et al., "Wavelet Image Coding with Adaptive Thresholding," 4 pp. (2002).

"10. Configuring mythfrontend," downloaded from the World Wide Web, 7 pp. (downloaded Oct. 17, 2007).

Chang et al., "Adaptive Wavelet Thresholding for Image Denoising and Compression," *IEEE Trans on Image Processing*, vol. 9, No. 9, pp. 1532-1546 (Sep. 2000).

Chrysafis et al., "Context-based Adaptive Image Coding," *Proc. of the 30th Asilomar Conf. on Signals, Systems, and Computers*, 5 pp. (Nov. 1996).

Gavrilescu et al., "Embedded Multiple Description Scalar Quantizers," *IEE Electronics Letters*, vol. 39, No. 13, 12 pp. (Jun. 2003).

Luo et al., "A Scene Adaptive and Signal Adaptive Quantization for Subband Image and Video Compression Using Wavelets," *IEEE Trans. on Circuits and Systems for Video Tech.*, vol. 7, No. 2, pp. 343-357 (Apr. 1997).

Munsil et al., "DVD Benchmark—Special Report, The Chroma Upsampling Error and the 4:2:0 Interlaced Chroma Problem," downloaded from the World Wide Web, 19 pp. (document marked Apr. 1, 2001).

Nadenau, "Integration of Human Color Vision Models into High Quality Image Compression," Thesis, 216 pp. (2000).

Orton-Jay et al., "Encoding for Blu-ray Disc and HD DVD—Reaping the Benefits of Integrated Mastering," *SONIC Digital Vision*, 22 pp. (document marked Apr. 12, 2007).

Tomasi et al., "Bilateral Filtering for Gray and Color Images," *IEEE Int'l Conf. on Computer Vision*, 8 pp. (Jan. 1998).

Turaga et al., "Content-Adaptive Filtering in the UMCTF Framework," *IEEE*, pp. I-821 through I-824 (Apr. 2003).

Tziritas et al., "A Hybrid Image Coder: Adaptive Intra-Interframe Prediction Using Motion Compensation," *Sixth MDSP Workshop*, pp. 224-230 (Sep. 1989).

van der Schaar et al., "Unconstrained Motion Compensated Temporal Filtering (UMCTF) Framework for Wavelet Video Coding," *IEEE*, pp. II-581 through II-584 (Apr. 2003).

"VC-1/PEP and POSTERIZATION," AVS Forum, downloaded from the World Wide Web, 13 pp. (document marked Apr. 27, 2007).

Wang et al., "Adaptive Image Matching in the Subband Domain," *Proc. SPIE*, 12 pp. (Dec. 2004).

Watson et al., "Visibility of Wavelet Quantization Noise," *IEEE Trans. on Image Processing*, vol. 6, No. 8, pp. 1164-1175 (Aug. 1997).

Calderbank et al., "Wavelet transforms that map integers to integers," Mathematics Subject Classification, Aug. 1996, 39 pages.

Donoho et al., "Data compression and Harmonic Analysis," IEEE transaction on information theory, vol. 44, No. 6, Oct. 1998, pp. 2435-2476.

ISO/IEC, "Study text (version 3) of ISO/IEC 14496-10:2005/FPDAM3 Scalable Video Coding (in integrated form with ISO/IEC 14996-10)," ISO/IEC JTC 1/SC 29/WG 11 N8962, pp. 59-103, 175-196, 404-423, 453-470 (Apr. 2007).

ITU-T, "CCITT Recommendation T.81: Information Technology—Digital Compresion and Coding of Continuous-Tone Still Images—Requirements and Guidelines," 190 pp. (Sep. 1992).

ITU-T, "ITU-T Recommendation T.84: Terminals for Telematic Services—Information Technology—Digital Compression and Coding of Continuous-Tone Still Images: Extensions," 84 pp. (Jul. 1996).

ITU-T, "ITU-T Recommendation T.801: JPEG 2000 image coding system: Extensions," 334 pp. (Aug. 2002).

Man et al., "Three-Dimensional Subband Coding Techniques for Wireless Video Communications," IEEE Trans. on Circuits and Systems for Video Technology, vol. 12, No. 6, pp. 386-397 (Jun. 2002).

Marcellin et al., "An overview of quantization in JPEG 2000," Signal Processing: Image Communication, vol. 17, pp. 73-84 (Jan. 2002).

Srinivasan et al., "HD Photo: A new image coding technology for digital photography," Proc. of SPIE, Vo. 6696, 19 pp. (Jan. 2007).

Tong, "A perceptually adaptive JPEG coder," Thesis, University of Toronto, 124 pp. (1997).

Watson, "Perceptual Optimization of DCT Color Quantization Matrices," IEEE Conf. on Image Processing, pp. 100-104 (Nov. 1994).

Wu et al., "Bit-depth scalability compatible to H.264/AVC-scalable extension," J. Vis. Commun. Image R., vol. 19, pp. 372-381 (Jun. 2008).

Yoo et al., "Adaptive Quantization of Image Subbands with Efficient Overhead Rate Selection," IEEE Conf. on Image Processing, pp. 361-364 (Sep. 1996).

Chai et al., "Face Segmentation Using Skin-Color Map in Videophone Applications," IEEE Transaction on Circuits and Systems for Video Technology, vol. 9, No. 4, pp. 551-564, Jun. 1999.

Correia et al., "Classification of Video Segmentation Application Scenarios," IEEE Transactions on Circuits and Systems for Video Technology, vol. 14, No. 5, pp. 735-741, May 2004.

Daly et al., "Face-Based Visually-Optimized Image Sequence Coding," 1998 International Conference on Image Processing, vol. 3, pp. 443-447, Oct. 1998.

Lee et al., "Spatio-Temporal Model-Assisted Compatible Coding for Law and Very Low Bitrate Videotelephony," 3rd IEEE International Conference on Image Processing, 4 pages, Sep. 1996.

Malah, "Time-Domain Algorithms for Harmonic Reduction and Time Scaling of Speech Signals," IEEE Transactions on Acoustics, Speech, and Signal Processing, vol. ASSP-27, No. 2, Apr. 1979, 13 pages.

Richardson, H.264 and MPEG-4 Video Compression, pp. 50-56 and 187-196 (2003).

* cited by examiner

Fig. 5
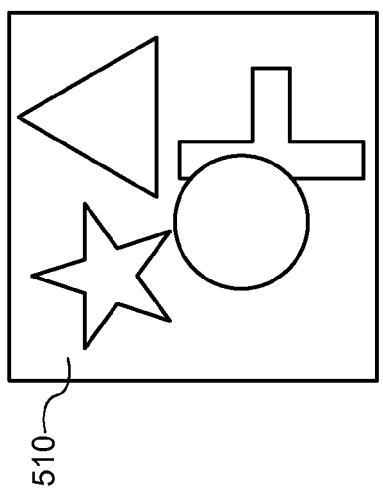
510
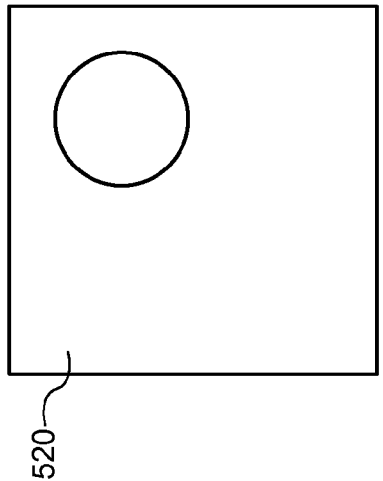
520
Differences in Spatial Complexity
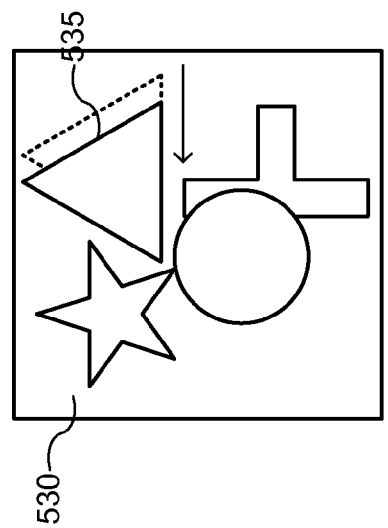
535
530
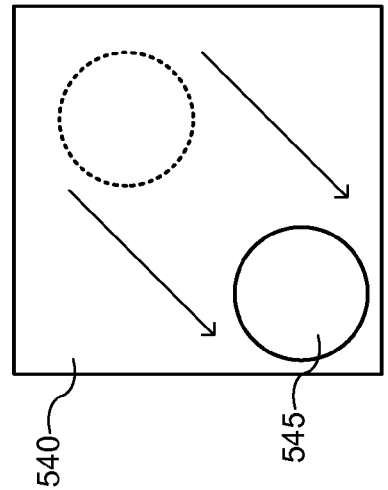
540
545
Differences in Temporal Complexity Software 1180 Implementing Complexity-Based Preprocessing Techniques

COMPLEXITY-BASED ADAPTIVE PREPROCESSING FOR MULTIPLE-PASS VIDEO COMPRESSION

BACKGROUND

Block Transform-Based Coding

Transform coding is a compression technique used in many audio, image and video compression systems. Uncompressed digital image and video is typically represented or captured as samples of picture elements or colors at locations in an image or video frame arranged in a two-dimensional (2D) grid. This is referred to as a spatial-domain representation of the image or video. For example, a typical format for images consists of a stream of 24-bit color picture element samples arranged as a grid. Each sample is a number representing color components at a pixel location in the grid within a color space, such as RGB, or YIQ, among others. Various image and video systems may use various different color, spatial and time resolutions of sampling. Similarly, digital audio is typically represented as time-sampled audio signal stream. For example, a typical audio format consists of a stream of 16-bit amplitude samples of an audio signal taken at regular time intervals.

Uncompressed digital audio, image and video signals can consume considerable storage and transmission capacity. Transform coding reduces the size of digital audio, images and video by transforming the spatial-domain representation of the signal into a frequency-domain (or other like transform domain) representation, and then reducing resolution of certain generally less perceptible frequency components of the transform-domain representation. This generally produces much less perceptible degradation of the digital signal compared to reducing color or spatial resolution of images or video in the spatial domain, or of audio in the time domain.

Quantization

According to one possible definition, quantization is a term used in transform coding for an approximating non-reversible mapping function commonly used for lossy compression, in which there is a specified set of possible output values, and each member of the set of possible output values has an associated set of input values that result in the selection of that particular output value. A variety of quantization techniques have been developed, including scalar or vector, uniform or non-uniform, with or without dead zone, and adaptive or non-adaptive quantization.

The quantization operation is essentially a biased division by a quantization parameter which is performed at the encoder. The inverse quantization or multiplication operation is a multiplication by the quantization parameter performed at the decoder.

Additional Techniques

In general, video compression techniques include intraframe compression and interframe compression. Intraframe compression techniques compress individual frames, typically called I-frames or key frames. Interframe compression techniques compress frames with reference to preceding and/or following frames, which are typically called predicted frames, P-frames, or B-frames.

In addition to the mechanisms described above, video encoding can also benefit from the use of preprocessing prior to encoding to provide for more efficient coding. In one example, denoise filters are used to remove extraneous noise from a video source, allowing a later encoding step to operate with greater efficiency.

However, with typical video encoding, it is difficult to know how exactly to perform preprocessing in order to create the most efficient encoding with the fewest number of visible artifacts. What is needed is a mechanism for gaining knowledge about a video source which can be used to facilitate preprocessing decisions.

SUMMARY

Multiple-pass video encoding systems and techniques are described. In various implementations, these systems and techniques utilize statistics taken during a first-pass encoding to create complexity measurements for video data to be encoded. In one implementation, through analyzing these complexity measurements, preprocessing decisions, such as the determination of strength of denoise filters, are made. In one implementation, temporal and spatial complexity parameters are calculated as the complexity measurements. These parameters are then used to compute a unified complexity parameter for each group of pictures being encoded.

In one example implementation, a method of determining parameters for pre-processing of a group of one or more pictures is described. The example method comprises determining one or more complexity parameters for the group of pictures and encoding the group of pictures in a video stream based at least in part on the one or more complexity parameters.

In another example implementation, a system for encoding video is described. The example system comprises a first-pass video encoding module which is configured to analyze one or more frames in a video sequence and to calculate one or more encoding parameters to be used in encoding the one or more frames in the video sequence. The example system also comprises a complexity-based adaptive preprocessing module which is configured to determine one or more complexity parameters for the one or more frames and to determine preprocessing filters to be used during encoding the one or more frames based on the one or more complexity parameters. The example system also comprises a second-pass video encoding module which is configured to apply preprocessing filters to the one or more frames based on the preprocessing filter parameters and to encode the filtered frames into encoded video stream data.

In another example implementation, one or more computer-readable media are described which contain instructions which, when executed by a computer, cause the computer to perform an example method for encoding video. The example method comprises performing a first-pass analysis on one or more frames in a video sequence in order to calculate one or more encoding parameters to be used in encoding the one or more frames in a video sequence. The example method also comprises determining one or more complexity parameters for the one or more frames based on the one or more encoding parameters, determining preprocessing filters to be used during encoding the one or more frames based on the one or more complexity parameters, applying preprocessing filters to the one or more frames based on the preprocessing filter parameters, and performing a second-pass analysis on the one or more frames to encoding the filtered frames into encoded video stream data.

BRIEF DESCRIPTION OF THE DRAWINGS

FIG. 5 is a block diagram illustrating examples of pictures demonstrating differences in temporal and spatial complexity.

DETAILED DESCRIPTION

The exemplary techniques and systems described herein allow for and perform additional preprocessing on video data in a multiple-pass video encoding system. After a first pass is performed, video statistics based on the first-pass encoding are analyzed to determine complexity parameters from the first-pass encoding process. These complexity parameters are then used to control preprocessing performed on the video data. In one example, the preprocessing performed is the application of a filter. The preprocessed video data is then encoded by a later pass of the encoding system. By determining and utilizing complexity data, the systems and techniques described herein can use the content of the encoded video to make more-informed decisions about what preprocessing should or should not be performed. This results in more efficient video encoding that is more accurate to the qualities of the video being encoded. Additionally, the techniques described herein offer very little overhead in the encoding process, and so do not overly complicate encoding.

Examples of Multiple-Pass Video Encoding Systems

Multiple-pass video encoders generally perform a first encoding on video data in order to determine statistics about the video data. These statistics are then used to create controls for later processing and encoding. By using information gained during a first-pass analysis, multiple-pass encoding systems are able to perform processing and encoding that is more accurately directed toward the particular nature of the video being encoded. This tuning of the process results in an eventual encoded video stream that either has a lower bit-rate, has fewer visible artifacts, or both.

Figure 1:
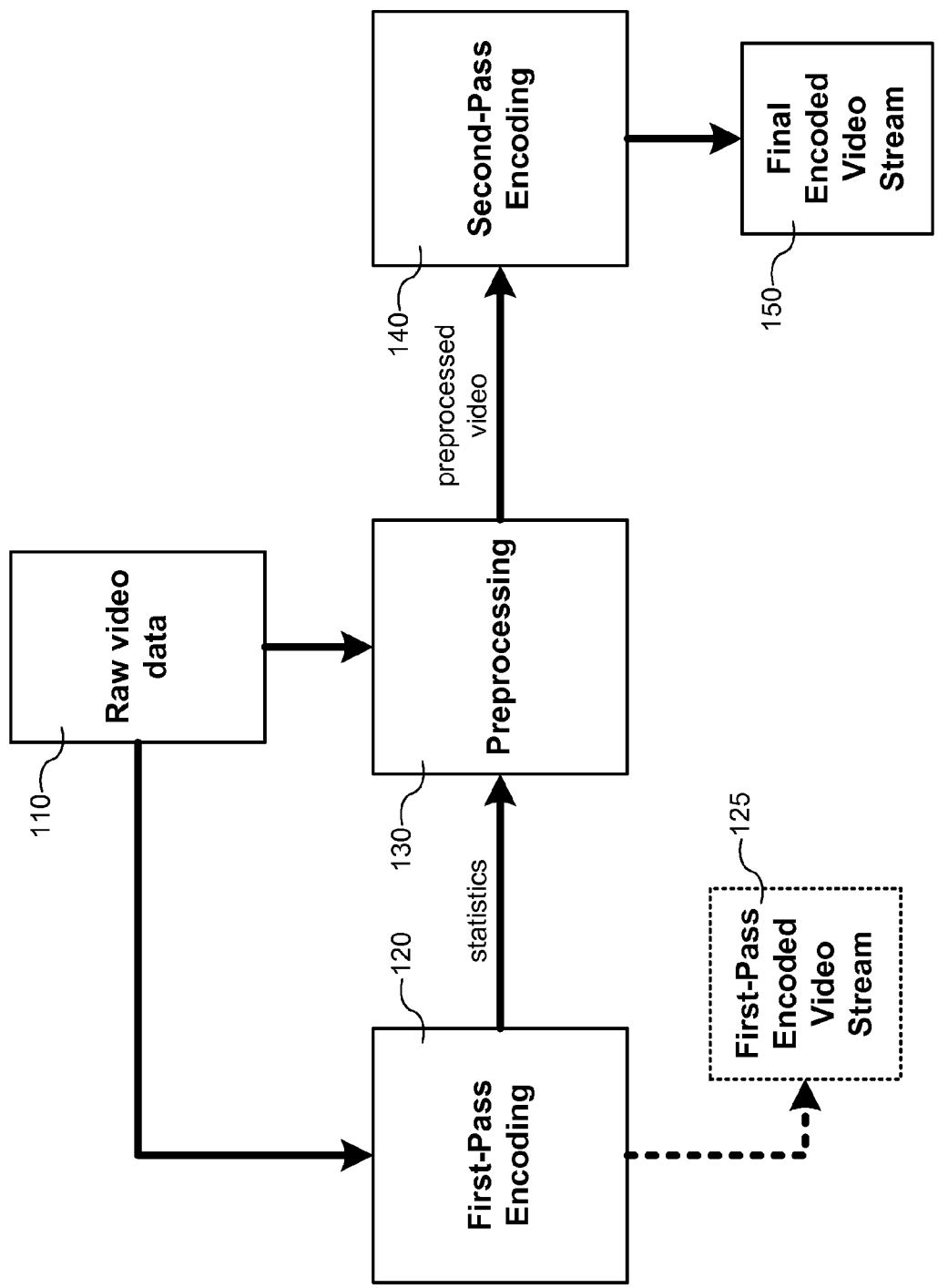
FIG. 1 illustrates an example of the operation of a multiple-pass video encoding system.

FIG. 1 is a block diagram illustrating one example of a multiple-pass video encoding system 100. As FIG. 1 exists to explicate background qualities of multiple-pass encoding, the figure illustrates only particular entities and processes which take place in a multiple-pass video encoding process. The particular qualities of the illustration of FIG. 1 should not be viewed to imply any limitation on or requirements for the techniques and systems described herein.

FIG. 1 illustrates raw video data 110, which is used as input into the system. The use of the term "raw video data" is used herein solely to refer to video data that is yet to be processed by the encoder, and should not be read to imply any particular limitation as to format or type of the video data. Thus, the term "raw video data" may, in various implementations, refer to compressed or uncompressed video, either recorded or generated by a computer and from a variety of sources.

FIG. 1 illustrates a first-pass encoding process 120. It is in this process that the raw video data 110 is first analyzed using the techniques described herein, in order to determine video statistics, which are then sent to a preprocessing process 130. In the illustrated implementation, the first-pass encoding process utilizes an actual video encoder to perform the first-pass analysis, resulting in a first-pass encoded video stream 125. While the encoding system 100 may utilize this output in its entirety, or may store this output, in many implementations this output is not provided by the system as a final output encoded video. For example, a system which uses a two-pass system to generate a variable bit-rate encoded video stream may first use a simpler constant bit-rate encoding method at block 120 to determine statistics which may be useful during preprocessing and encoding. This constant bit-rate stream may later be discarded after it has been used for variable bit-rate encoding.

FIG. 1 also illustrates a preprocessing process 130. In various implementations, this block illustrates such processes as determination of data to control bit-rate or the determination of filters which may be applied to the raw video data before final encoding. In one particular example, described in more detail below, the preprocessing involves various implementations which utilize the application of filters, such as, for example, low-pass or bilateral filters. These filters in general act to reduce source complexities before encoding. Thus, they may act to smooth pictures in the raw video data, or to smooth while maintaining edges in the case of a bi-lateral filter. But while the use of these filters allow easier and more accurate encoding during later passes, using too strong a filter may cause unwanted side-effects to a particular picture, especially if the picture is less complex. Conversely, using too weak a filter could result in video streams which are not as efficient as they could be for a given video. Thus, as will be described below, a particularly complex picture in a video may make a higher rate of preprocessing filtering more desirable than a less-complex picture would. The techniques described below seek to deal with this problem by determining complexity parameters which can be used to determine a level of filter strength which can be applied during preprocessing.

In the particular illustrated example, the preprocessing 130 takes the raw video data as input and applies preprocessing filters or other techniques to it before passing it to a second-pass encoding 140, where the processed video data is then encoded into a final encoded video stream 150. In other implementations, the preprocessing 130 may simply analyze the statistics provided it by the first-pass encoding 120 and give control data to the second-pass encoding 140, which would then take the raw video data 110 as input and encode the raw video data according to the control data. The result is a final encoded video stream which is then output from the video encoding system. Note also that in alterative implementations, more than two passes may be used before outputting a final encoded video stream.

Figure 2:
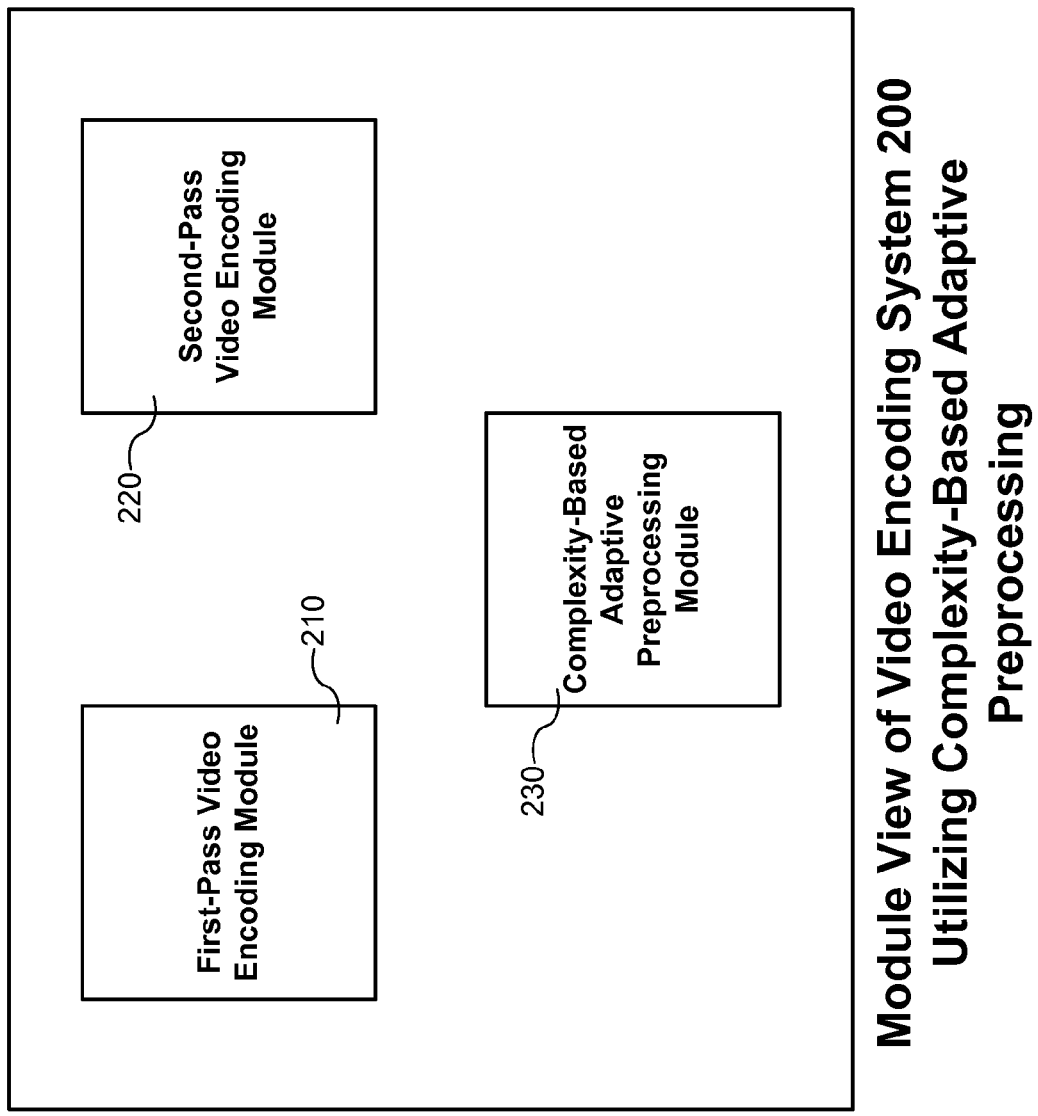
FIG. 2 is a block diagram illustrating an example system for performing complexity-based adaptive preprocessing in a multiple-pass video encoding system.

FIG. 2 is a block diagram illustrating a Video Encoding System 300 which utilizes the complexity-based adaptive preprocessing techniques described herein to encode video. FIG. 2 illustrates modules 210-230 which perform various processes in the course of performing the complexity-based adaptive preprocessing techniques described herein. While the modules of FIG. 2 are illustrated separately, in various implementations the modules may be combined or split into more modules; additionally, the modules may represent hardware, software, or a combination thereof.

In the illustrated implementation, the display system 200 comprises a first-pass video encoding module 210. In one implementation, this module is configured to accept raw video data and perform a first-pass encoding of the video data. As discussed above, this first pass is performed in order to acquire statistics about the video data that can then be used in later encoding. Additionally, in various implementations the first-pass video encoding module may also produce a first-pass encoded video stream which may or may not be used in later encoding.

The illustrated implementation also shows a complexity-based adaptive preprocessing module 230, which is configured to perform preprocessing on the raw video data (or the first-pass encoded data, in alternative implementations), before final encoding. Then, in the illustrated implementation, a final encoding is performed by the second-pass encoding module 220, which is configured in one implementation to accept preprocessed video data from the complexity-based adaptive preprocessing module and perform a final encoding on it. In alternative implementations, additional video encoding modules (not illustrated) may also be included in the system 200 and/or the two (or more) encoding modules may be combined into a single module.

Figure 3:
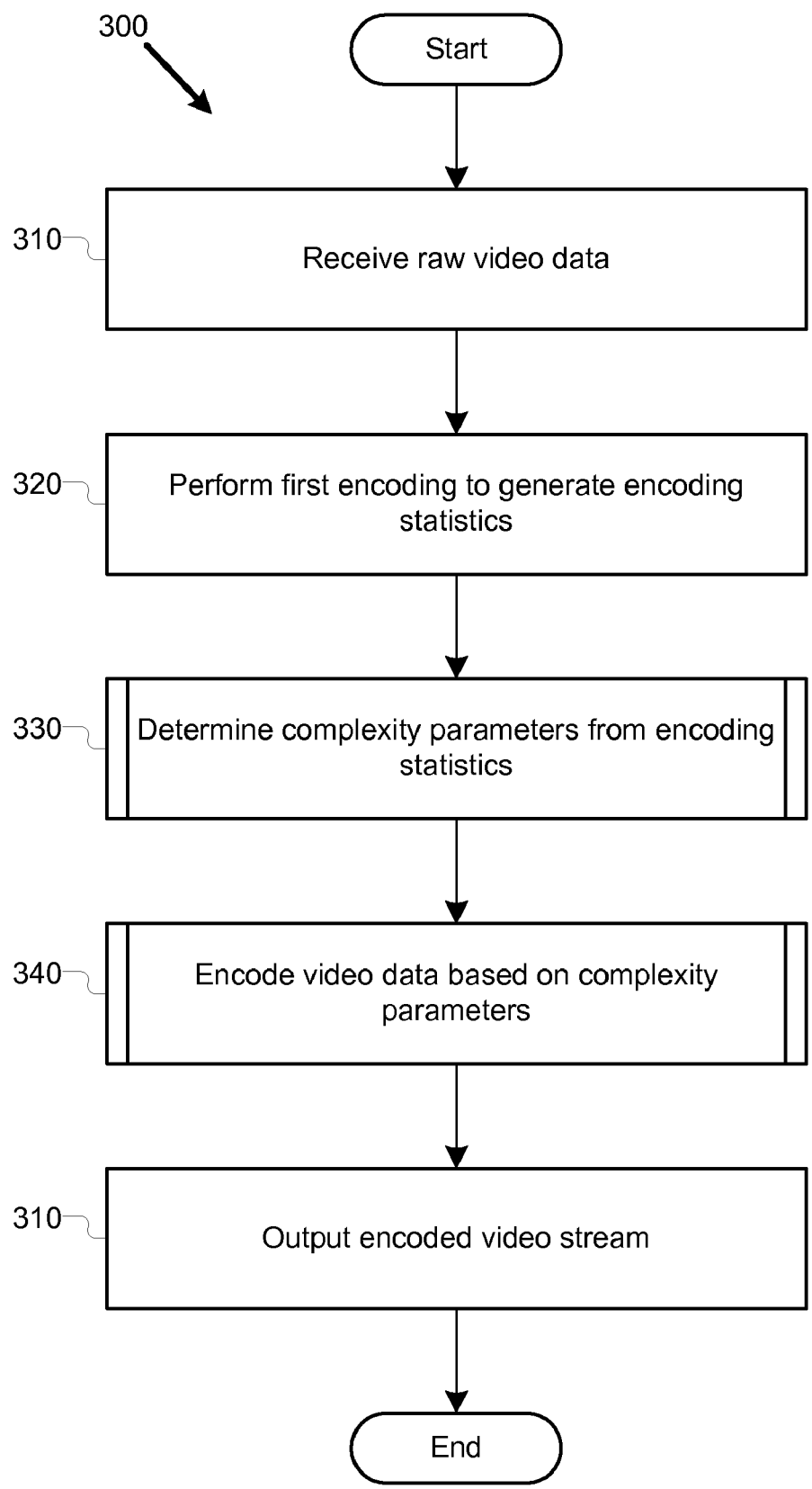
FIG. 3 is flowchart illustrating an example process performed by the system of FIG. 2 for encoding video data.

FIG. 3 is a flowchart of an example process 300 performed by the video encoding system 200 for encoding video according to the techniques described herein. In various implementations, the illustrated process blocks may be merged, divided into sub-blocks, or omitted. The process begins at block 310, where the system receives raw video data. As discussed above, in various implementations, different raw video data formats may be supported by the system 200. Additionally, in alternative implementations the system 200 may receive video data that has already been encoded, either by a similar encoding method to that used in process 300 or by a different method.

Next, the process continues to block 320, where a first encoding is performed in order to generate encoding statistics. In some implementations, the encoding is performed according to the VC-1 video encoding standard. In other implementations other standards may be used, including, but not limited to, Windows Media Players 7, 8 and 9, H.264, MPEG-2, MPEG-4. During the process of block 320, various statistics may be reported. However, for the ease of description, the techniques described herein will be performed only with reference to two statistics: the frame size and quantization parameter for each frame encoded during the process of block 320. Thus, in one implementation only quantization parameters and frame sizes for each frame are recorded after this first pass. In another implementation, if variable quantization parameters are used during the first pass, an average over the frame is recorded for use during preprocessing. In alternative implementations, other statistics may be collected which provide additional information about complexity and can be used in preprocessing.

Next, the process 300 continues to block 330, where the system 200 determines complexity parameters from the encoding statistics determined at block 320. Particular examples of processes to determine complexity parameters are described below. Next, at block 340, the system 200 encodes the video data based on the complexity parameters determined at the process of block 330. Particular examples of processes to encode video data using complexity parameters are described below as well.

Finally, in one implementation, the encoded video stream created at block 340 is output by the system 200. In alternative implementations, additional encoding or post-processing modifications may be made to the video stream before output, but for the sake of simplicity these implementations are not illustrated.

Figure 4:
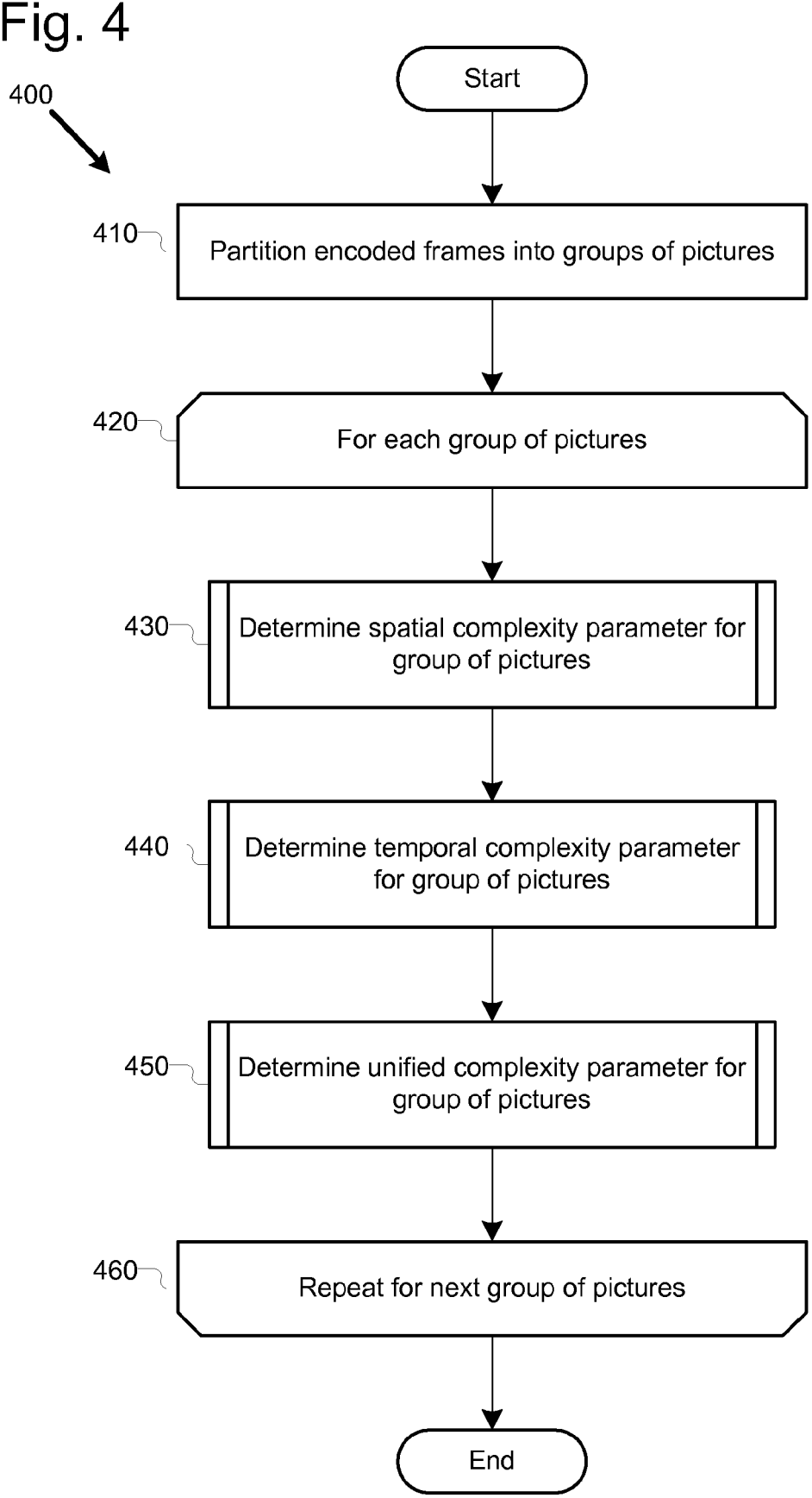
FIG. 4 is a flowchart illustrating an example process performed by the system of FIG. 2 as a part of the process of FIG. 3 for determining complexity parameters.

FIG. 4 is a flowchart of an example process 400 performed by the video encoding system 200 for determining complexity parameters from encoding statistics. In various implementations, the illustrated process blocks may be merged, divided into sub-blocks, or omitted. The process begins at block 410, where the system partitions frames encoded during the first-pass encoding process into groups of pictures. In a preferred implementation, the term "group of pictures" is a term of art, used to refer to a set of one or more frames containing at least a single I-frame as well as P- and B-frames when applicable. Thus, the process of block 410, in one such an implementation, partitions the first-pass encoded frames into smaller sets of frames until each set contains only one I-frame. In alternative implementations different partitions may be used or the entire encoded video may be analyzed as a whole. Additionally, while the process of block 410 discusses the partitioning of "frames" for the purpose of simplicity of description, in some implementations the process may be performed only with reference to video statistics. Thus, both the partitioning and further analysis may be done solely through manipulation of statistics which are associated with frames; the unneeded video data itself may be discarded in such implementations.

Next, at block 420, the process begins a loop to analyze each partitioned group of pictures. Then, at block 430, the system determines a spatial complexity parameter for the currently-analyzed group of pictures. This is followed, at block 440, by the system determining a temporal complexity parameter for the current group of pictures. Descriptions of temporal and spatial complexity will follow.

The last illustrated block in the loop is at block 450, where a unified complexity parameter is determined for the group of pictures. While in some implementations, including ones described below, the unified complexity parameter is determined through manipulation of the previously-determined temporal and spatial complexity parameters, in some implementations, the unified complexity parameter by be determined through other analysis. In yet other implementations a unified parameter may not be calculated at all, but instead individual parameters, such as the spatial and temporal complexity parameters computed in blocks 430 and 440, may be used for preprocessing. Finally, at block 460, the loop is repeated for the next group of pictures.

Examples of Determining Complexity

FIG. 5 is a block diagram illustrating examples of video pictures with differences in spatial and temporal complexity. FIG. 5 seeks to provide an abstract handle on the calculations described below, which will demonstrate how to determine parameters for spatial and temporal complexity for a group of pictures. The illustrations in FIG. 5 are chosen for their simplicity and serve only to represent the ideas of spatial and temporal complexity for a group of pictures, not to represent an actual group of pictures, or even particular pictures, themselves.

Each of the ideas illustrated in FIG. 5 seeks to capture the idea that different source data may be more or less complex and different raw video data may exhibit complexities in different ways. Thus, a video containing a static room is easier, generally, to encode than a video capturing a busy street. By bifurcating complexities into temporal and spatial complexities, the calculations used to measure complexity are made simpler, both to understand and to implement.

Example images 510 and 520 illustrate differences in spatial complexity. In one implementation spatial complexity captures the idea of the number of details in a video frame. Thus, in the example shown, image 510, which contains many shapes, some of which are overlapped, contains a non-trivially greater amount of spatial complexity than does image 520, which has only a single circle in it.

By contrast, in one implementation temporal complexity captures the difficulty in predicting one frame from a previously-encoded frame. An example of this is illustrated in images 530 and 540. Please note that in each of the two images 530 and 540 movement within the image is illustrated through the use of arrows and dotted figures; this is merely an abstraction of movement that would take place over the course of various frames within a group of pictures. In the examples of images 530 and 540, image 530 shows a lower temporal complexity than does image 540. This is because, while image 530 has a high spatial complexity, its only movement, and thus the only part of the frame that needs to be predicted, is a simple sideways movement of the triangle 535. In contrast, image 540 shows a large movement of the circle 545, which provides a more difficult task of prediction, and therefore raises the level of temporal complexity of the group of pictures represented by image 540.

Figure 6:
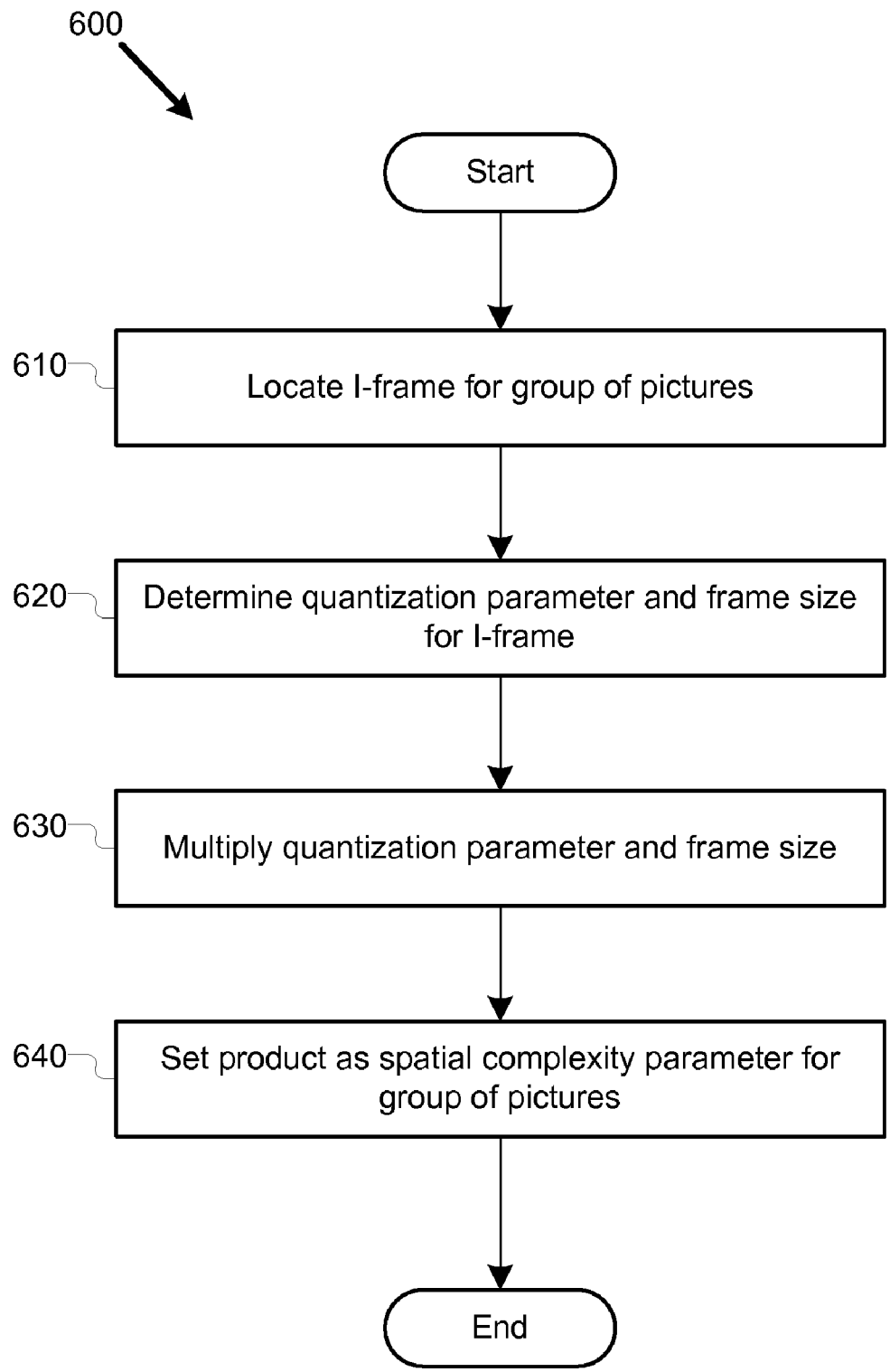
FIG. 6 is a flow chart illustrating an example process performed as part of the process of FIG. 4 for determining a spatial complexity parameter.

FIG. 6 is a flowchart of an example process 600 performed by the video encoding system 200 for determining a spatial complexity parameter for a group of pictures from encoding statistics. In one implementation, the system performs the process of FIG. 6 as an implementation of the process of block 430 of FIG. 4. In various implementations, the illustrated process blocks may be merged, divided into sub-blocks, or omitted. In general, the process of 600 serves to calculate a spatial complexity parameter by taking the quantization parameter of an I-frame within the group of pictures, whose value is related to the amount of detail in the I-frame, and to combine that with the I-frame's frame size. Thus, generally, as quantization parameters and/or frame sizes increase for an I-frame in a group of pictures, the level of detail, and thus spatial complexity, of the image shown by that group of pictures is assumed to increase.

The process begins at block 610, where an I-frame is located for the group of pictures being analyzed. As mentioned above, in a preferred implementation, there is only one I-frame within the group of pictures. Next, the quantization parameter and frame size are determined for this I-frame. In one implementation, this determination may consist solely of looking up the recorded values for the quantization parameter and the frame size for the I-frame. In another, when variable quantization parameters are used, an average quantization parameter is found for the I-frame to ease later computations.

Next, at block 630, the quantization parameter and frame size for the I-frame are multiplied and, at block 640, this product is set as the spatial complexity parameter for the group of pictures. Thus, for a quantization parameter and frame size for the I-frame of $QP_1$ and $Size_1$, respectively, the spatial complexity parameter for every frame in the group of pictures is calculated by:

$$C_s = QP_1 \times Size_1$$

In alternative implementations, the calculation of the spatial complexity parameter may be modified by scaling either or both of the input statistics before combining them into the final parameter. Thus, one or both of the quantization parameter and frame size may be scaled exponentially, or may be multiplied by a scale before calculating a spatial complexity parameter.

Figure 7:
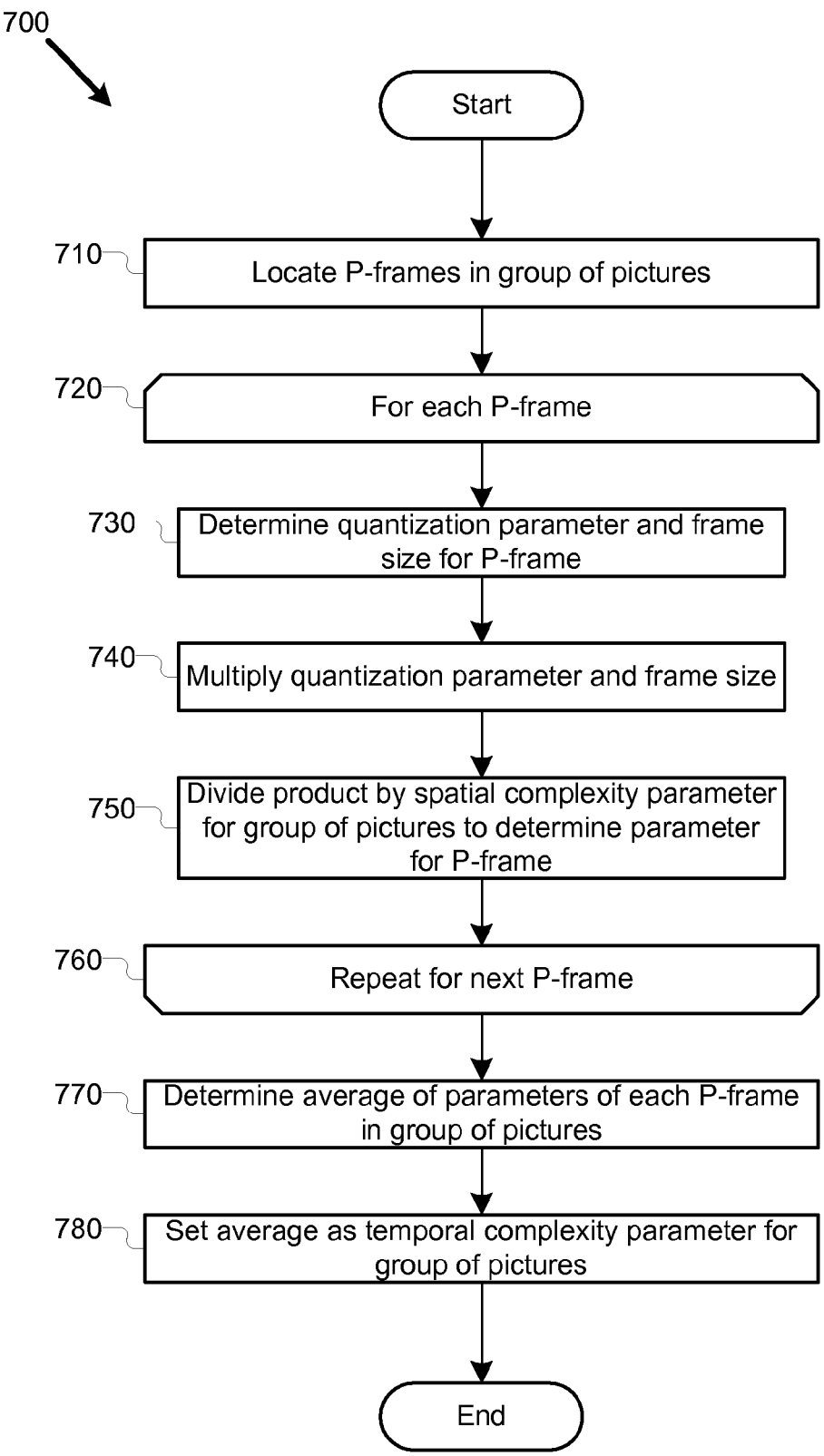
FIG. 7 is a flow chart illustrating an example process performed as part of the process of FIG. 4 for determining a temporal complexity parameter.

FIG. 7 is a flowchart of an example process 700 performed by the video encoding system 200 for determining a spatial complexity parameter for a group of pictures from encoding statistics. In one implementation, the system performs the process of FIG. 7 as an implementation of the process of block 440 of FIG. 4. In various implementations, the illustrated process blocks may be merged, divided into sub-blocks, or omitted. In general, the process of 700 serves to calculate a spatial complexity parameter by taking the quantization parameters of P-frames within the group of pictures, whose value is related to the amount of change exhibited in the group of pictures over the group's reference I-frame, and to combine that with the P-frames' frame sizes. Thus, generally, as quantization parameters and/or frame sizes increase for P-frames in a group of pictures, the amount of change that is predicted, and thus the temporal complexity of the image shown by that group of pictures, is assumed to increase.

The process begins at block 710, where one or more P-frames are located for the group of pictures being analyzed. As mentioned above, in a preferred implementation, there is only one I-frame and a collection of P-frames (as well as B-frames) within the group of pictures. Next, at block 720, a loop is performed to analyze each P-frame within the group of pictures.

At block 730, the quantization parameter and frame size are determined for the particular P-frame being analyzed. In one implementation, this determination may consist solely of looking up the recorded values for the quantization parameter and the frame size for the P-frame. An another, when variable quantization parameters are used, an average quantization parameter is found for the P-frame to ease later computations.

Next, at block 740, the quantization parameter and frame size for the P-frame are multiplied. Thus, for a quantization parameter and frame size for the P-frame of $QP_p$ and $Size_p$, respectively, the a first product is calculated for the P-frame by:

$$C_t' = QP_p \times Size_p$$

While this product does capture the general concept that lower temporal complexity should lead to a smaller frame size at a given QP, experimentation has discovered that the above measure is largely related to spatial complexity. Thus, given the same amount of motion and the same QP, a scene with higher spatial complexity is likely to have a bigger-sized P-frame compared to a low spatial complexity scene. In some implementations of encoders, this is due to imperfections in the capturing process and motion-estimation processes.

To account for this correlation, at block 750, the product given above is divided by the spatial complexity parameter for the P-frame. As discussed, above, in the illustrated implementation of FIG. 6, this spatial complexity parameter was calculated for every frame in the group of pictures by calculating it for the I-frame in the group. This gives a more-accurate measure for the temporal complexity of P-frame as:

$$C_t = \frac{C_t'}{C_s}$$

This process is then repeated for each P-frame in the group of pictures, at block 760.

Next, in order to have a single temporal complexity parameter for the group of pictures, an average of the temporal complexity parameters for the P-frames in the group of pictures is taken. This is performed by the system in block 770. Finally, at block 780 this average is set as the temporal complexity parameter for the group of pictures.

Figure 8:
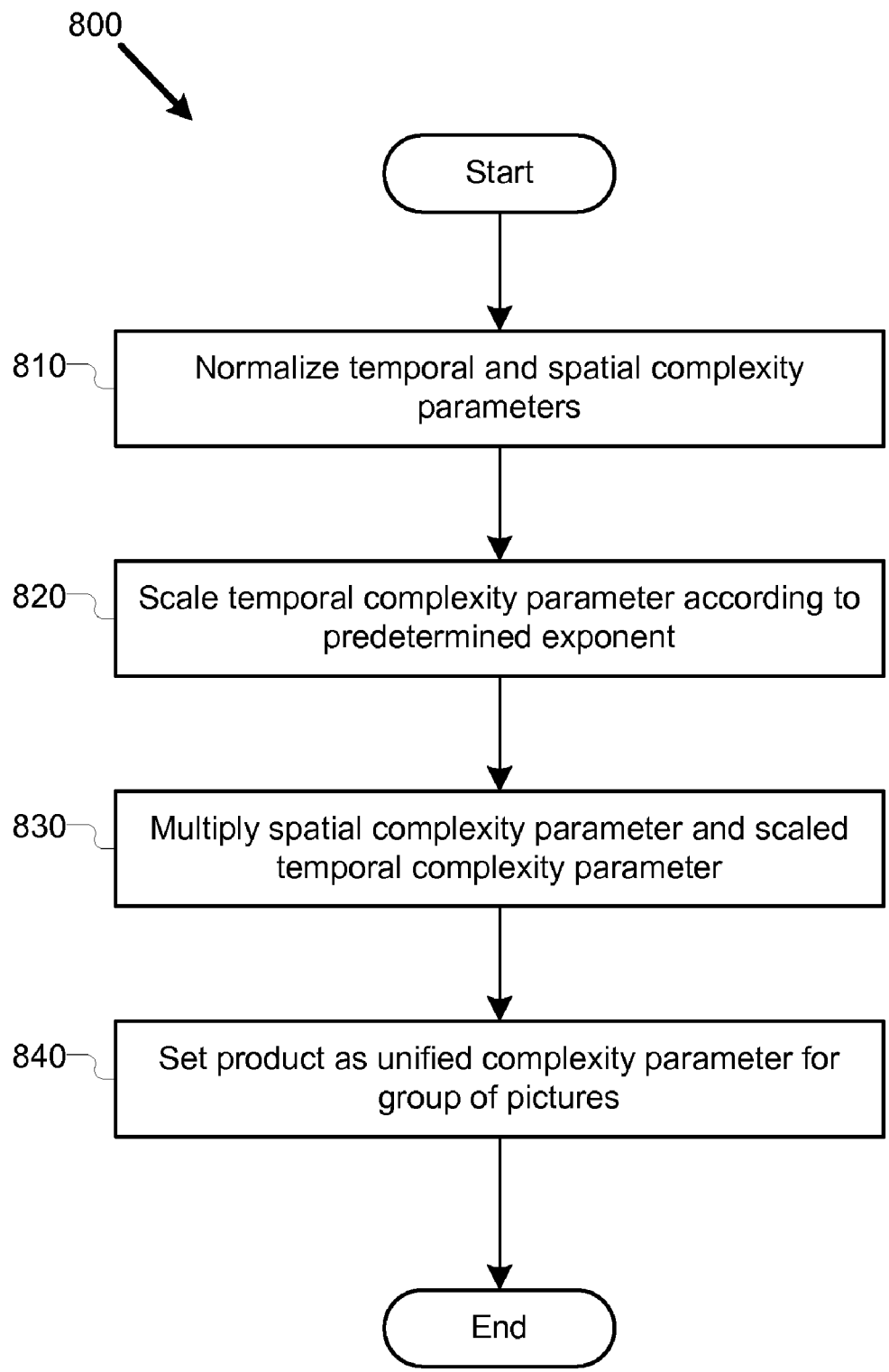
FIG. 8 is a flow chart illustrating an example process performed as part of the process of FIG. 4 for determining a unified complexity parameter.

FIG. 8 is a flowchart of an example process 800 performed by the video encoding system 200 for determining a unified complexity parameter for a group of pictures from the temporal and spatial complexity paramters. In one implementation, the system performs the process of FIG. 8 as an implementation of the process of block 450 of FIG. 4. In various implementations, the illustrated process blocks may be merged, divided into sub-blocks, or omitted. In general, the process of FIG. 8 serves to create a combined, single complexity parameter which can serve as a shorthand for the general complexity of a group of pictures. In alternative implementations, a unified complexity parameter may be created from different complexity calculations or may be omitted altogether in lieu of more-detailed complexity parameters.

The illustrated process begins at block 810, where the temporal and spatial complexity parameters are normalized. In one implementation, this normalization is performed according to the following two equations:

$$C_t = Int\left(\frac{C_t^*}{MAXCOMP_{Temporal}} \times 255\right)$$

$$C_s = Int\left(\frac{C_s^*}{MAXCOMP_{Spatial}} \times 255\right)$$

where $C_t^*$ and $C_s^*$ are the previously-calculated temporal and spatial complexity parameters, respectively, and $MAXCOMP_{Temporal}$ and $MAXCOMP_{Spatial}$ are numbers considered as the upper bounds of the complexities. In one implementation, used in the VC-1 encoder, $MAXCOMP_{Temporal}$ and $MAXCOMP_{Spatial}$ are chosen to be two numbers close to $2 \times 10^8$ and 2.0, respectively. In one implementation, if either of the above calculations results in a number greater than 255, that number is clipped to remain inside the interval [0, 255].

Next, at block 820, the normalized temporal complexity parameter is scaled according to a predetermined exponent. This is done to adjust the relative strength of the spatial and temporal complexities within the unified complexity paramters. In one implementation, a value of 0.5 is used as an exponent for the temporal complexity parameter. Next, at block 830 the scaled temporal complexity parameter and the spatial complexity parameter are multiplied and at block 840 this product is set as the unified complexity parameter for the group of pictures. Thus, the unified complexity parameter is found as:

$$C = C_s \times C_t^\alpha$$

where $\alpha$ is the scaling exponent used in block 820. It should be noticed that this equation can be written in an equivalent fashion as:

$$C = C_s^{(1-\alpha)} \times (C_t')^\alpha$$

This alternative form demonstrates more clearly the capability of the $\alpha$ exponent as a relative strength control between the two particular complexity parameters.

Examples of Complexity-Based Adaptive Preprocessing

Figure 9:
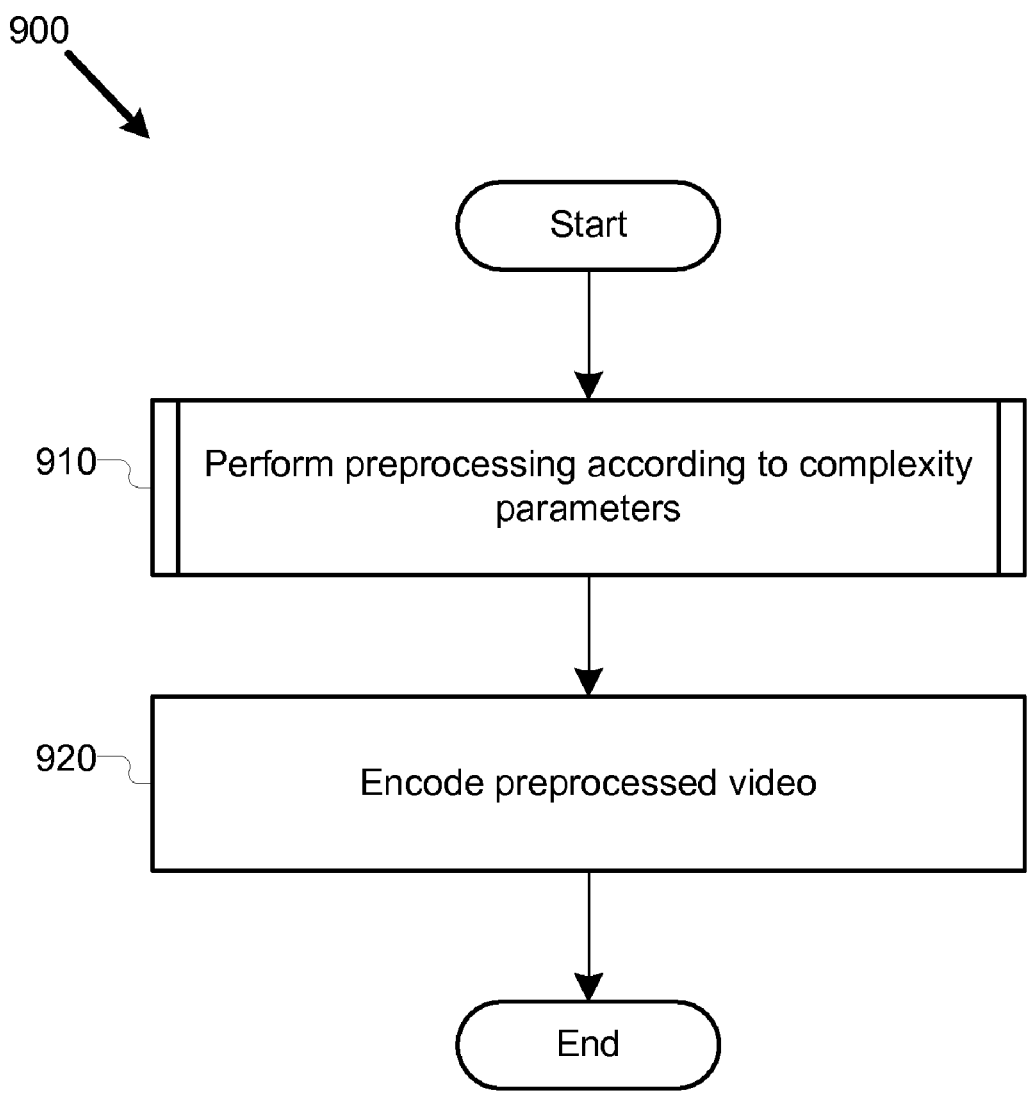
FIG. 9 is a flowchart illustrating an example process performed as part of the process of FIG. 3 for encoding video based on complexity parameters.

FIG. 9 is a flowchart of an example process 900 performed by the video encoding system 200 for encoding video data based on complexity parameters. In one implementation, the system performs the process of FIG. 9 as an implementation of the process of block 340 of FIG. 3. In various implementations, the illustrated process blocks may be merged, divided into sub-blocks, or omitted. The process begins at block 910, where the system performs preprocessing according to the complexity parameters calculated during implementations of the above-described processes. As discussed above, this preprocessing may be performed with reference to raw video data or to already-encoded video data in different implementations. Next, at block 910, the system 200 encodes the preprocessed video. This encoding may be performed by the same encoding engine utilized during earlier analyses, or, in alternative implementations, may be performed by a different encoder or one configured according to different specifications than one used during an earlier encoding pass.

Figure 10:
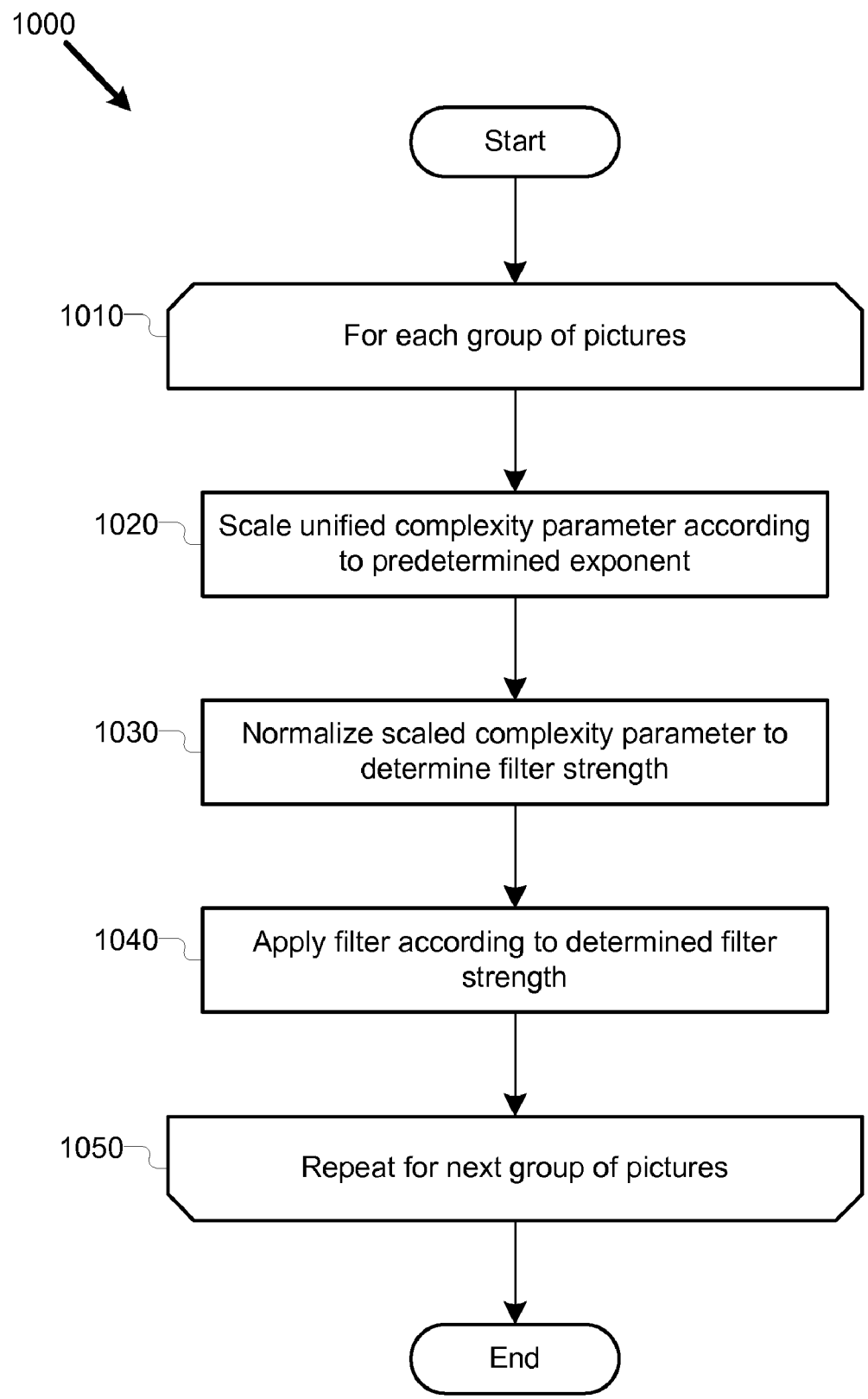
FIG. 10 is a flow chart illustrating an example process performed as part of the process of FIG. 9 for determining performing filtering preprocessing according to complexity parameters.

FIG. 10 is a flowchart of an example process 1000 performed by the video encoding system 200 for performing preprocessing on video data based on complexity parameters. In one implementation, the system performs the process of FIG. 10 as an implementation of the process of block 910 of FIG. 9. In various implementations, the illustrated process blocks may be merged, divided into sub-blocks, or omitted. While the process illustrated in FIG. 10 performs only control of filtering strength according to complexity parameters, in alternative implementations, other preprocessing techniques may be used. The process begins at block 1010, where the system loops over every group of pictures in the video to be encoded. In the case where the preprocessing is performed on raw video data, the preprocessing may take place on sections of the raw video data corresponding to the particular group of pictures at issue. Within the loop, at block 1020, the system first scales the unified complexity parameter according to a predetermined exponent. This is done to modulate the complexity in order to obtain a mapping between complexity parameter and filter strength that is appropriate to the specific design of an encoder's preprocessing filters (such as, for example a denoise filter). In experimental trials, a value of 1.2 was found to work well for a VC-1 encoding system.

Next, at block 1030, the scaled complexity parameter is normalized to form an appropriate filter strength value. In the case of the VC-1 encoding, one implementation gives the scaling and normalization calculations according to the following equation:

$$FilterStrength = (C^\beta - 2048) \gg 10$$

Where $\beta$ is the exponential scale of block 1020 (e.g. 1.2 in a VC-1 encoding system), and the operator $\gg$ represents a right bit-shift operation. Additionally, in some implementations, if the resulting FilterStrength value is outside of the proper range for the filters being used, the number is clipped. Thus, in an exemplary VC-1 implementation, FilterStrength is clipped to reside in the range [0, 8]. Next, at block 1040, the filters are applied to the group of pictures (or raw video associated therewith) according to the calculated filter strength. The loop then repeats for additional groups of pictures at block 1050.

It should be noted that the estimated complexities $C_s$, $C_t$, and $C$ may be used in alternative implementations to make better encoding decisions in other encoding and preprocessing modules. For example, and not by way of limitation, the system may make rate control decisions at to what quantization parameter, second quantization parameter or P- or B-frame delta quantization parameters to use, if the system considers the three complexity parameters from multiple frame altogether. In another example, a quantization module of an encoding system may benefit from the use of complexity parameters, such as using a bigger deadzone for quantization in the case of a high value for C.

Computing Environment

The above surface approximation techniques can be performed on any of a variety of computing devices. The techniques can be implemented in hardware circuitry, as well as in software executing within a computer or other computing environment, such as shown in FIG. 11.

Figure 11:
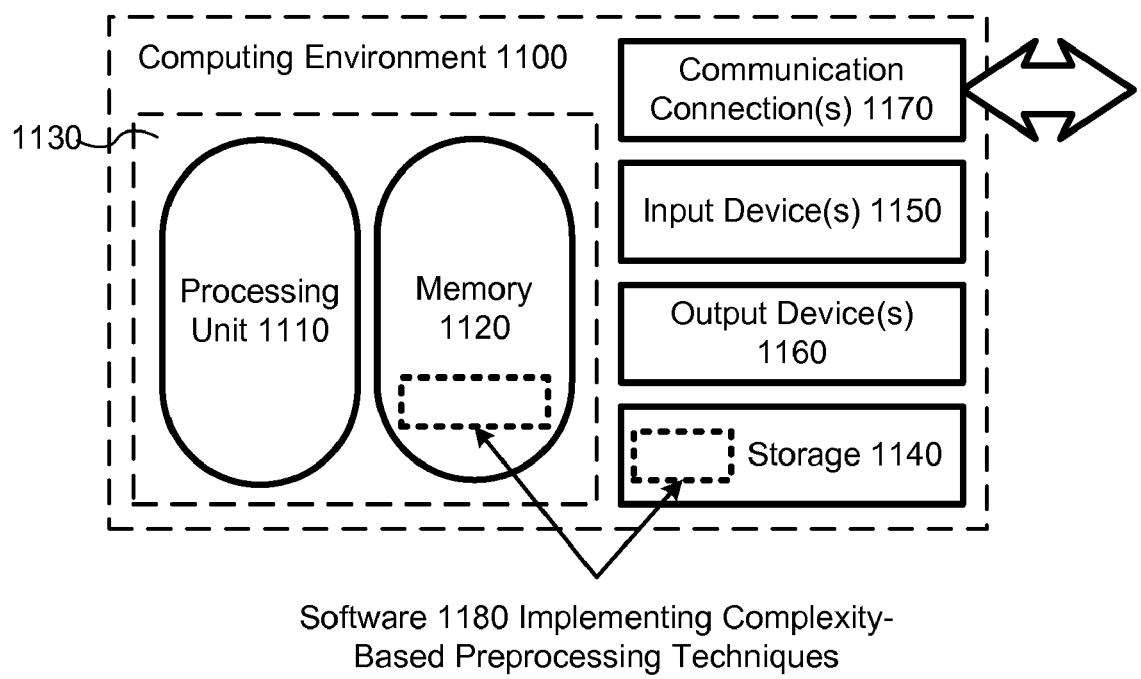
FIG. 11 is a block diagram illustrating an example computing environment for performing the complexity-based adaptive preprocessing techniques described herein.

FIG. 11 illustrates a generalized example of a suitable computing environment 1100 in which described embodiments may be implemented. The computing environment 1100 is not intended to suggest any limitation as to scope of use or functionality of the invention, as the present invention may be implemented in diverse general-purpose or special-purpose computing environments.

With reference to FIG. 11, the computing environment 1100 includes at least one processing unit 1110 and memory 1120. In FIG. 11, this most basic configuration 1130 is included within a dashed line. The processing unit 1110 executes computer-executable instructions and may be a real or a virtual processor. In a multi-processing system, multiple processing units execute computer-executable instructions to increase processing power. The memory 1120 may be volatile memory (e.g., registers, cache, RAM), non-volatile memory (e.g., ROM, EEPROM, flash memory, etc.), or some combination of the two. The memory 1120 stores software 1180 implementing the described techniques.

A computing environment may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other medium which can be used to store information and which can be accessed within the computing environment 1100. The storage 1140 stores instructions for the software 1180 implementing the described techniques.

The input device(s) 1150 may be a touch input device such as a keyboard, mouse, pen, or trackball, a voice input device, a scanning device, or another device that provides input to the computing environment 1100. For audio, the input device(s) 1150 may be a sound card or similar device that accepts audio input in analog or digital form, or a CD-ROM reader that provides audio samples to the computing environment. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques described herein can be described in the general context of computer-readable media. Computer-readable media are any available media that can be accessed within a computing environment. By way of example, and not limitation, with the computing environment 1100, computer-readable media include memory 1120, storage 1140, communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "calculate," "generate," and "determine," to describe computer operations in a computing environment. These terms are high-level abstractions for operations performed by a computer, and should not be confused with acts performed by a human being. The actual computer operations corresponding to these terms vary depending on implementation.

In view of the many possible variations of the subject matter described herein, we claim as our invention all such embodiments as may come within the scope of the following claims and equivalents thereto.

We claim:

1. A method of determining parameters for pre-processing of a group of one or more pictures, the method comprising:
    determining one or more complexity parameters for the group of pictures; and
    encoding, using an encoder, the group of pictures in a video stream based at least in part on the one or more complexity parameters to transform the group of one or more pictures into an encoded group of pictures;
    wherein determining the one or more complexity parameters is based at least in part on spatial and temporal complexity of the group of pictures and wherein determining one or more complexity parameters comprises:
    determining a spatial complexity parameter for the group of pictures;
    determining a temporal complexity parameter for the group of pictures;
    determining a unified complexity parameter by combining the spatial and temporal complexity parameters; and
    adjusting one or both of the spatial and temporal complexity parameters for the group of pictures by a predetermined factor to adjust a relative strength of the parameters and wherein either or both of the spatial and temporal complexity parameters are normalized before calculating a unified complexity parameter.

2. The method of claim 1, wherein determining a spatial complexity parameter for the group of pictures comprises multiplying a quantization parameter for at least one frame found in the group of pictures with a frame size for at least one frame found in the group of pictures.

3. The method of claim 1, wherein the quantization parameter and frame size used in determining a spatial complexity parameter are calculated with reference to an I-frame in the group of pictures.

4. The method of claim 1, wherein determining a temporal complexity parameter comprises:

calculating a temporal complexity parameter for each of one or more P-frames in the group of pictures; and calculating an average of the temporal complexity parameters calculated for each of the one or more P-frames in the group of pictures.

5. The method of claim 4, wherein calculating a temporal complexity parameter for a frame comprises multiplying a quantization parameter for each of the one or more frames with a frame size for each of the one or more frames.

6. The method of claim 5, wherein calculating a temporal complexity parameter for a frame further comprises dividing the product of the quantization parameter and the frame size by the spatial complexity parameter for that frame.

7. The method of claim 1, wherein determining a unified complexity parameter by combining the spatial and temporal complexity parameters comprises:

after adjusting, multiplying the spatial and temporal complexity parameters together to calculate a unified complexity parameter.

8. The method of claim 1, wherein encoding the group of pictures in a video stream based at least in part on the one or more complexity parameters comprises selecting a filter strength based on the value of the one or more complexity parameters.

9. The method of claim 8, wherein selecting a filter strength based on the value of the one or more complexity parameters comprises:

scaling a unified complexity parameter by a predetermined exponential value; and normalizing the scaled parameter to a predetermined set of filter-strength values.

10. A system for encoding video, comprising:

a first-pass video encoding module in an encoding device, configured to analyze one or more frames in a video sequence and to calculate one or more encoding parameters to be used in encoding the one or more frames in the video sequence;

a complexity-based adaptive preprocessing module, configured to determine one or more complexity parameters for the one or more frames and to determine preprocessing filters to be used during encoding the one or more frames based on the one or more complexity parameters, the complexity parameters being based on a combined spatial and temporal complexity wherein one or both of the spatial or temporal complexity parameters are normalized for the one or more frames of the video sequence and scaled to adjust a relative strength thereof; and a second-pass video encoding module, configured to apply preprocessing filters to the one or more frames based on the preprocessing filter parameters and to encode the filtered frames into encoded video stream data.

11. The system of claim 10, wherein the first-pass video encoding module is configured to calculate, for each of a plurality of frames in the video sequence, a quantization parameter and a frame size and the adaptive preprocessing module is configured to determine a spatial complexity parameter and a temporal complexity parameter for each group of pictures in the video sequence based on the calculated quantization parameters and frame sizes.

12. The system of claim 11, wherein the adaptive preprocessing module is configured to determine a spatial complexity parameter for a group of pictures in the video sequence by multiplying a quantization parameter for an I-frame by a frame size for that I-frame; and wherein the adaptive preprocessing module is configured to determine a temporal complexity parameter for a group of pictures in the video sequence by:

for each of a plurality of P-frames in the group of pictures, multiplying a quantization parameter for the P-frame by a frame size for that P-frame to determine a temporal complexity value for that P-frame;

scaling each temporal complexity value for each P-frame by dividing the temporal complexity value by the spatial complexity value for the group of pictures; and taking the average of the scaled temporal complexity values for the plurality of P-frames to determine a temporal complexity parameter for the group of pictures.

13. The system of claim 12, wherein the adaptive preprocessing module is further configured to calculate a unified complexity parameter for each group of pictures in the video sequence by:

normalizing temporal and spatial complexity parameters for the group of pictures;

scaling the temporal complexity parameter for the group of pictures by exponentiating it by a first pre-determined value; and multiplying the scaled temporal complexity for the group of pictures by the temporal complexity for the group of pictures to determine a unified complexity parameter for the group of pictures; and wherein the adaptive preprocessing module is further configured to determine preprocessing filters by:

scaling the unified complexity parameter for the group of pictures by exponentiating it by a second pre-determined value;

normalizing the scaled unified complexity parameter for the group of pictures to a filter value within a range of filter strength values; and selecting a filter strength according to the normalized filter value.

14. One or more computer-readable storage devices containing instructions which, when executed by a computer, cause the computer to perform a method for encoding video, the method comprising:

performing a first-pass analysis on one or more frames in a video sequence in order to calculate one or more encoding parameters to be used in encoding the one or more frames in a video sequence;

determining one or more complexity parameters for the one or more frames based on the one or more encoding parameters, the complexity parameters being based on spatial and temporal complexity that are combined by multiplying the spatial and temporal complexity parameters together to calculate a unified complexity parameter, and wherein at least one of the complexity parameters are normalized;

determining preprocessing filters to be used during encoding the one or more frames based on the one or more complexity parameters;

applying preprocessing filters to the one or more frames based on the preprocessing filter parameters; and performing a second-pass analysis on the one or more frames to encoding the filtered frames into encoded video stream data.

15. The computer readable media of claim 14, wherein performing a first-pass analysis on one or more frames in a video sequence in order to calculate one or more encoding parameters comprises calculating, for each of a plurality of frames in the video sequence, a quantization parameter and a frame size; and wherein determining one or more complexity parameters for the one or more frames comprises determining a spatial complexity parameter and a temporal complexity parameter for each group of pictures in the video sequence based on the calculated quantization parameters and frame sizes.

16. The computer-readable media of claim 15, wherein determining one or more complexity parameters for the one or more frames based on the one or more encoding parameters comprises:

determining a spatial complexity parameter for a group of pictures in the video sequence by multiplying a quantization parameter for an I-frame by a frame size for that I-frame; and determine a temporal complexity parameter for a group of pictures in the video sequence by:

for each of a plurality of P-frames in the group of pictures, multiplying a quantization parameter for the P-frame by a frame size for that P-frame to determine a temporal complexity value for that P-frame;

scaling each temporal complexity value for each P-frame by dividing the temporal complexity value by the spatial complexity value for the group of pictures; and taking the average of the scaled temporal complexity values for the plurality of P-frames to determine a temporal complexity parameter for the group of pictures.

17. The computer-readable media of claim 16, wherein determining one or more complexity parameters for the one or more frames based on the one or more encoding parameters further comprises calculating a unified complexity parameter for each group of pictures in the video sequence by:

normalizing temporal and spatial complexity parameters for the group of pictures;

scaling the temporal complexity parameter for the group of pictures by exponentiating it by a first pre-determined value; and multiplying the scaled temporal complexity for the group of pictures by the temporal complexity for the group of pictures to determine a unified complexity parameter for the group of pictures; and wherein determining preprocessing filters to be used during encoding the one or more frames based on the one or more complexity parameters comprises:

scaling the unified complexity parameter for the group of pictures by exponentiating it by a second pre-determined value;

normalizing the scaled unified complexity parameter for the group of pictures to a filter value within a range of filter strength values; and selecting a filter strength according to the normalized filter value.

\* \* \* \* \*